US012677176B2

(12) United States Patent
Xu et al.

(10) Patent No.: US 12,677,176 B2
(45) Date of Patent: Jul. 7, 2026

(54) ALIGNING TIME DURATIONS FOR SIGNALING AND MEASUREMENT

(71) Applicant: QUALCOMM Incorporated, San Diego, CA (US)

(72) Inventors: Huilin Xu, Temecula, CA (US); Jing Lei, San Diego, CA (US); Diana Maamari, San Diego, CA (US); Ahmed Elshafie, San Diego, CA (US); Peter Gaal, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 689 days.

(21) Appl. No.: 18/061,390

(22) Filed: Dec. 2, 2022

(65) Prior Publication Data

US 2024/0187902 A1     Jun. 6, 2024

(51) Int. Cl.
| | |
|---|---|
| *H04W 24/10* | (2009.01) |
| *H04W 56/00* | (2009.01) |
| *H04W 74/0833* | (2024.01) |

(52) U.S. Cl.
CPC ......... *H04W 24/10* (2013.01); *H04W 56/001* (2013.01); *H04W 74/0833* (2013.01)

(58) Field of Classification Search
CPC .............. H04W 24/10; H04W 56/001; H04W 74/0833
See application file for complete search history.

(56) References Cited

U.S. PATENT DOCUMENTS

| | | | | |
|---|---|---|---|---|
| 2009/0034452 | A1* | 2/2009 | Somasundaram .. | H04W 74/002 370/328 |
| 2015/0215912 | A1* | 7/2015 | Jha ........................ | H04W 76/28 370/311 |
| 2016/0249404 | A1* | 8/2016 | Höglund ........... | H04W 52/0216 |
| 2020/0022011 | A1* | 1/2020 | Lee ........................ | H04W 24/08 |
| 2020/0314861 | A1* | 10/2020 | Goel ................... | H04W 72/563 |
| 2020/0413460 | A1* | 12/2020 | Tang ................. | H04W 36/0061 |
| 2021/0321348 | A1* | 10/2021 | Ohara ................... | H04L 5/0094 |
| 2022/0123879 | A1* | 4/2022 | Munier ................. | H04W 64/00 |
| 2022/0322121 | A1* | 10/2022 | Cui ................... | H04W 74/0833 |
| 2022/0330147 | A1* | 10/2022 | Sarkis ................. | H04W 56/001 |
| 2023/0254934 | A1* | 8/2023 | Santhanam ....... | H04W 52/0229 370/329 |
| 2024/0098533 | A1* | 3/2024 | Leng ..................... | H04W 24/02 |

(Continued)

*Primary Examiner* — Liem H. Nguyen
(74) *Attorney, Agent, or Firm* — Holland & Hart LLP

(57) ABSTRACT

Methods, systems, and devices for wireless communications are described. A user equipment (UE) may receive, from a network entity, a control message indicating a set of periodicities determined at the network entity and associated with at least a first duration of a set of first durations for the UE to perform signaling and measurement, the first duration aligned outside of a second duration of a set of second durations for the UE to receive data based on the set of periodicities. The UE may perform one or more operations during the first duration based on the first duration of the set of first durations being aligned outside the second duration of the set of second durations. The UE and the network entity may communicate based on the control message indicating the set of periodicities and the UE performing the one or more operations during the first duration.

30 Claims, 19 Drawing Sheets

(56) References Cited

U.S. PATENT DOCUMENTS

| | | | |
|---|---|---|---|
| 2024/0334539 A1* | 10/2024 | Lee | H04W 76/28 |
| 2025/0047429 A1* | 2/2025 | Kong | H04L 5/0005 |
| 2025/0056565 A1* | 2/2025 | Guo | H04W 72/232 |
| 2025/0254617 A1* | 8/2025 | Xu | H04W 76/28 |

* cited by examiner

510

520

515

505

500

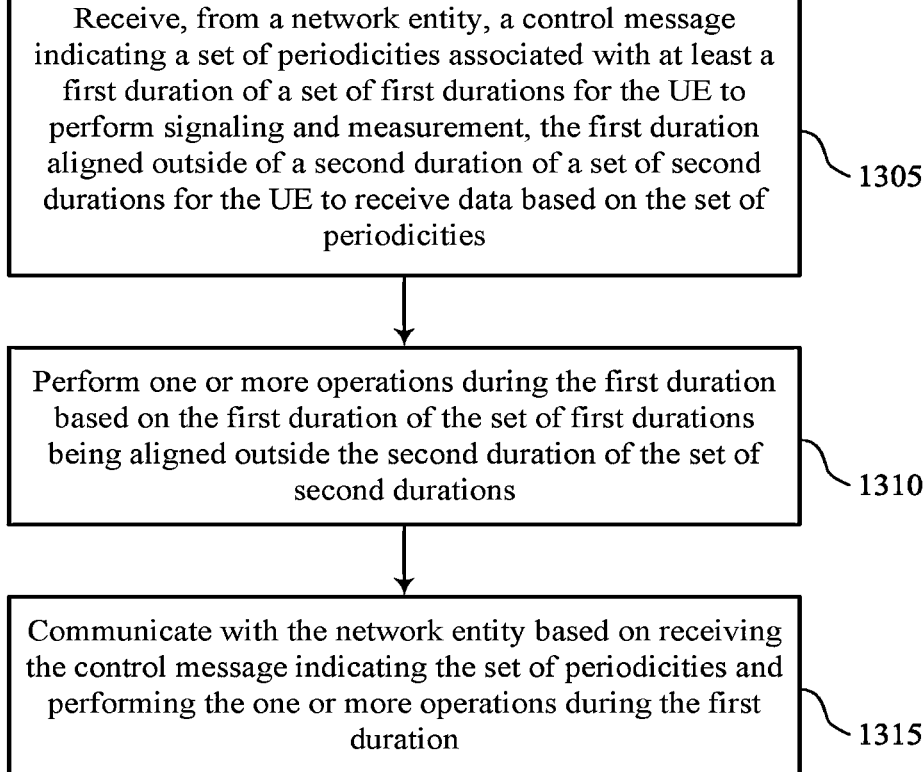

Receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities ⟍ 1305

Perform one or more operations during the first duration based on the first duration of the set of first durations being aligned outside the second duration of the set of second durations ⟍ 1310

Communicate with the network entity based on receiving the control message indicating the set of periodicities and performing the one or more operations during the first duration ⟍ 1315

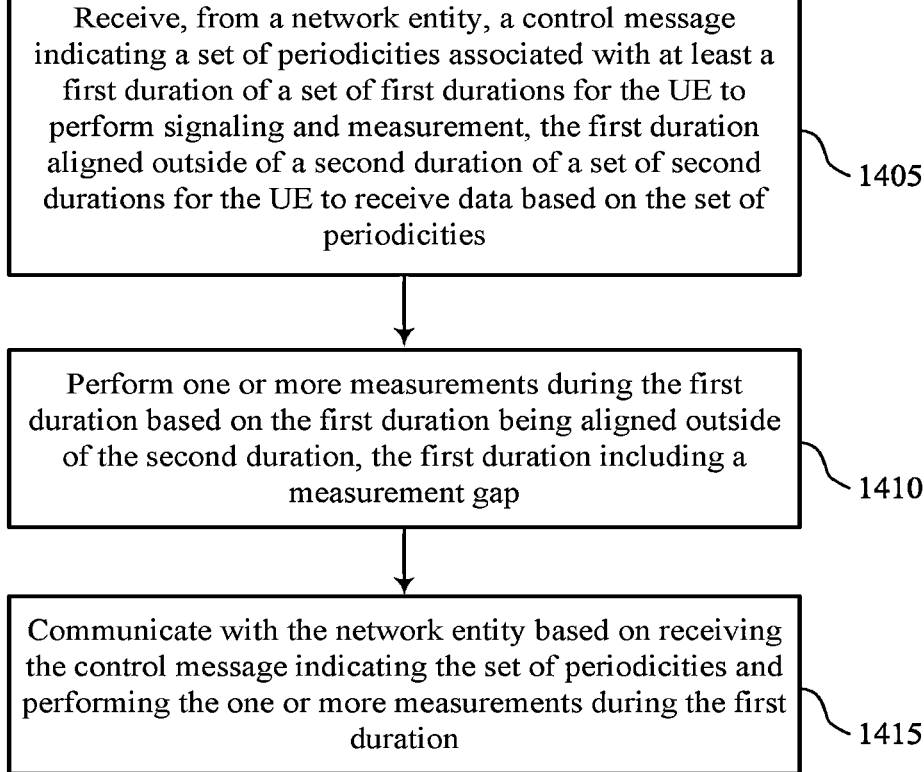

Receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities
1405

Perform one or more measurements during the first duration based on the first duration being aligned outside of the second duration, the first duration including a measurement gap
1410

Communicate with the network entity based on receiving the control message indicating the set of periodicities and performing the one or more measurements during the first duration
1415

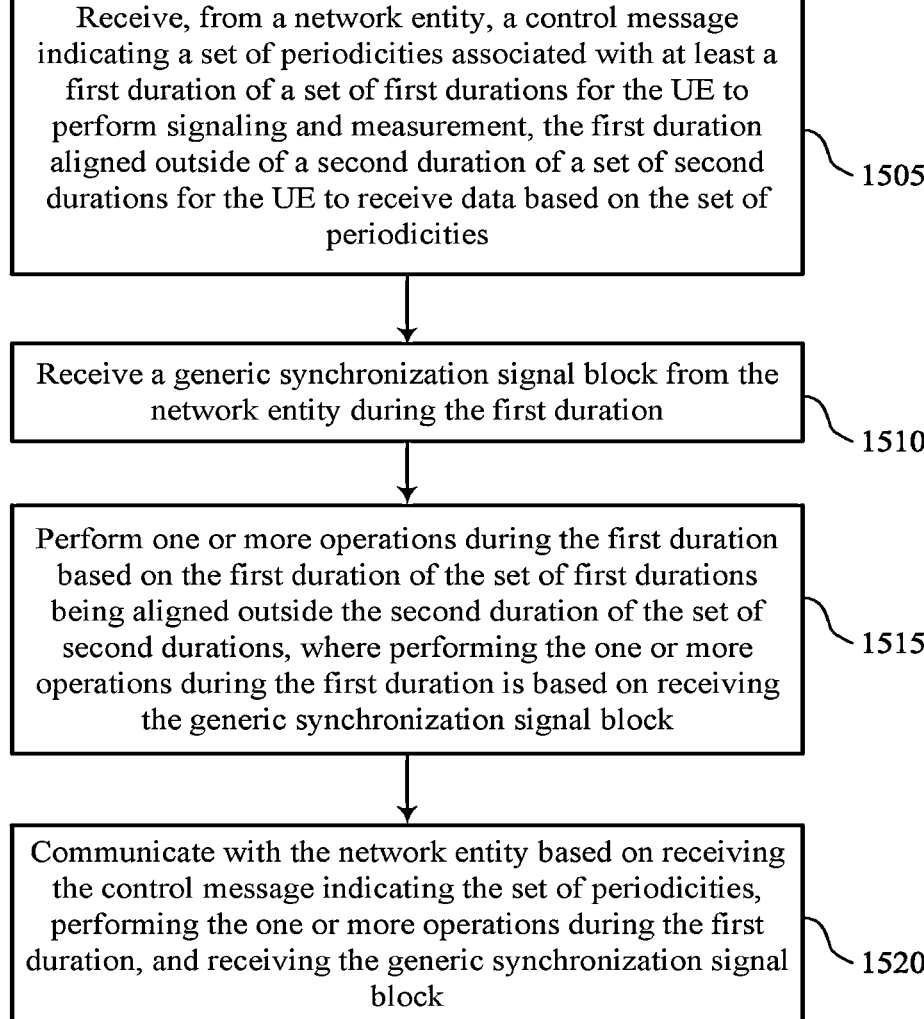

Receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities

1505

Receive a generic synchronization signal block from the network entity during the first duration

1510

Perform one or more operations during the first duration based on the first duration of the set of first durations being aligned outside the second duration of the set of second durations, where performing the one or more operations during the first duration is based on receiving the generic synchronization signal block

1515

Communicate with the network entity based on receiving the control message indicating the set of periodicities, performing the one or more operations during the first duration, and receiving the generic synchronization signal block

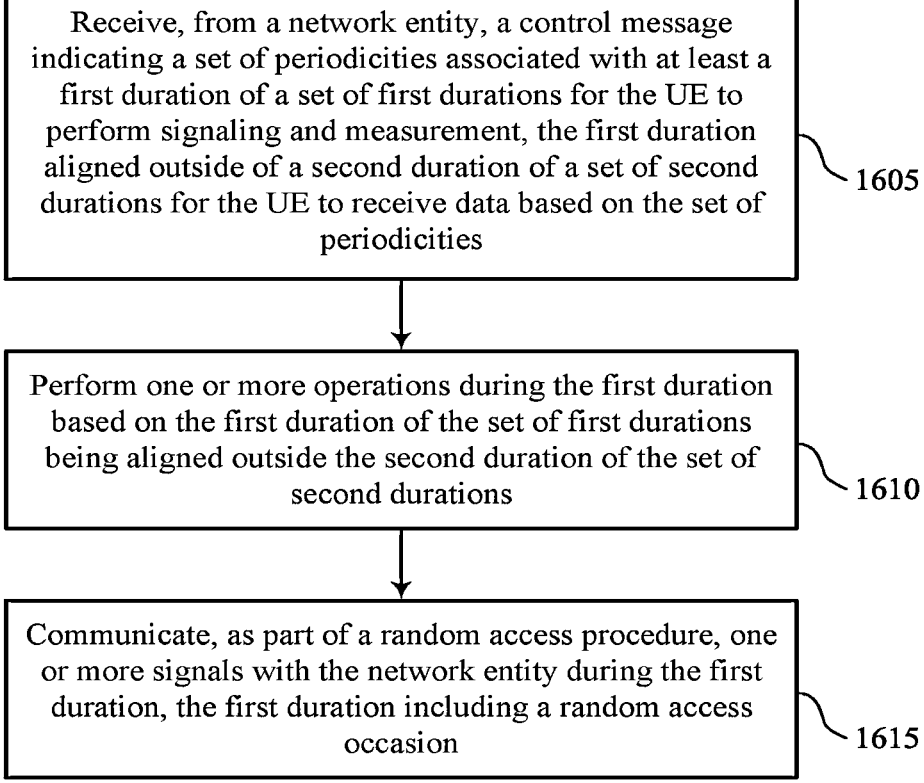

Receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities

1605

Perform one or more operations during the first duration based on the first duration of the set of first durations being aligned outside the second duration of the set of second durations

1610

Communicate, as part of a random access procedure, one or more signals with the network entity during the first duration, the first duration including a random access occasion

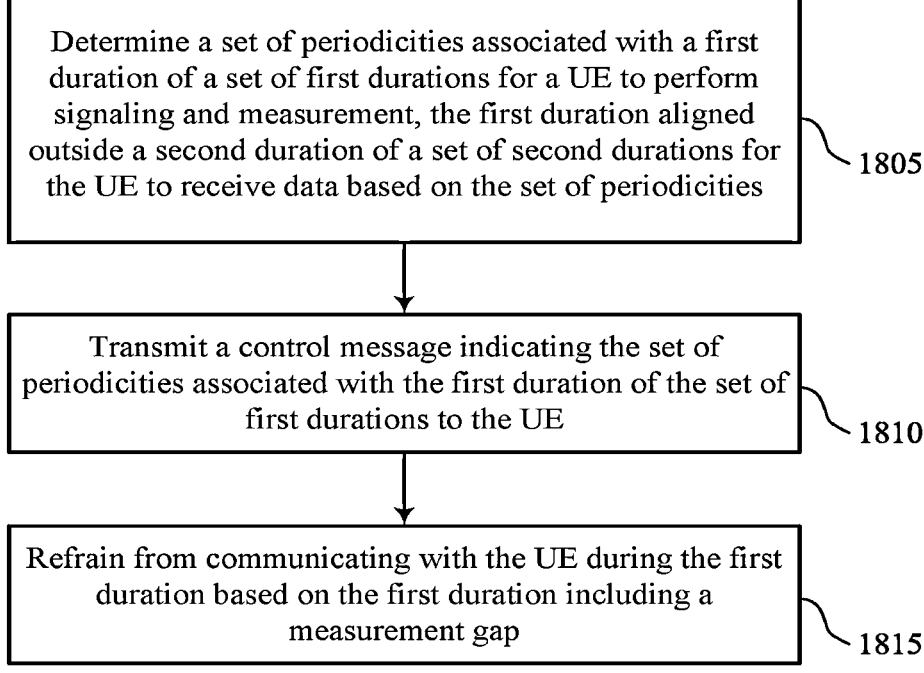

Determine a set of periodicities associated with a first duration of a set of first durations for a UE to perform signaling and measurement, the first duration aligned outside a second duration of a set of second durations for the UE to receive data based on the set of periodicities

1805

Transmit a control message indicating the set of periodicities associated with the first duration of the set of first durations to the UE

1810

Refrain from communicating with the UE during the first duration based on the first duration including a measurement gap

ALIGNING TIME DURATIONS FOR SIGNALING AND MEASUREMENT

FIELD OF TECHNOLOGY

The following relates to wireless communications, including measurement gap for aligning time durations for signaling and measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support aligning time durations for signaling and measurement. For example, the described techniques provide for enabling alignment of one or more first durations for signaling and measurement with one or more second durations for periodic signals (e.g., XR traffic). For example, a UE may receive control signaling from a network entity indicating a set of periodicities, and the UE may perform one or more operations based on receiving the control signaling. For example, the UE may perform one or more measurements of one or more synchronization signal blocks (SSBs) received from the network entity or another network entity during a first duration of the one or more first durations, where the first duration may include a measurement gap (MG). The UE and the network entity may also communicate based on the periodicities in the control signaling indicating a set of non-uniform periods for the time durations. For example, the UE and the network entity or another network entity (e.g., a neighboring network entity) may communicate one or more random access signals of a random access procedure, where the first duration may include a random access occasion. In some examples, the one or more operations and the communications performed during the first duration may be part of handover procedure, where the first duration may include receiving one or more SSBs, measuring the SSBs, and performing a random access procedure. In some cases, the control signaling may align the first durations outside the second durations by indicating a non-uniform periodicity, a rational periodicity, one or more offsets to align outside XR traffic, or one or more offsets to align outside a discontinuous reception (DRX) cycle of the UE.

A method for wireless communication at a UE is described. The method may include receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities, performing one or more operations during the first duration based on the first duration of the set of first durations being aligned outside the second duration of the set of second durations, and communicating with a network entity based on receiving the control message indicating the set of periodicities and performing the one or more operations during the first duration.

An apparatus for wireless communication at a UE is described. The apparatus may include a processor, memory coupled with the processor, and instructions stored in the memory. The instructions may be executable by the processor to cause the apparatus to receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities, perform one or more operations during the first duration based on the first duration of the set of first durations being aligned outside the second duration of the set of second durations, and communicate with a network entity based on receiving the control message indicating the set of periodicities and performing the one or more operations during the first duration.

Another apparatus for wireless communication at a UE is described. The apparatus may include means for receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities, means for performing one or more operations during the first duration based on the first duration of the set of first durations being aligned outside the second duration of the set of second durations, and means for communicating with a network entity based on receiving the control message indicating the set of periodicities and performing the one or more operations during the first duration.

A non-transitory computer-readable medium storing code for wireless communication at a UE is described. The code may include instructions executable by a processor to receive, from a network entity, a control message indicating a set of periodicities associated with at least a first duration of a set of first durations for the UE to perform signaling and measurement, the first duration aligned outside of a second duration of a set of second durations for the UE to receive data based on the set of periodicities, perform one or more operations during the first duration based on the first duration of the set of first durations being aligned outside the second duration of the set of second durations, and communicate with a network entity based on receiving the control message indicating the set of periodicities and performing the one or more operations during the first duration.

In some examples of the method, apparatuses, and non-transitory computer-readable medium described herein, performing the one or more operations during the first duration may include operations, features, means, or instructions for performing one or more measurements during the first duration based on the first duration being aligned outside of the second duration, the first duration including a MG.

Some examples of the method, apparatuses, and non-transitory computer-readable medium described herein may further include operations, features, means, or instructions for receiving a generic SSB from the network entity during the first duration, where performing the one or more operations during the first duration and communicating with the network entity may be based on receiving the generic SSB.

In some examples of the method, apparatuses, and non-transitory computer-readable medium described herein, the generic SSB indicates a slot offset and a symbol offset corresponding to a system frame number associated with the UE, the slot offset and the symbol offset based on the first duration being aligned outside of the second duration.

Some examples of the method, apparatuses, and non-transitory computer-readable medium described herein may further include operations, features, means, or instructions for receiving a cell defining SSB from the network entity based on a priority of a generic SSB being lower than a priority of the cell defining SSB, where performing the one or more operations during the first duration and communicating with the network entity may be based on receiving the cell defining SSB.

In some examples of the method, apparatuses, and non-transitory computer-readable medium described herein, communicating with the network entity may include operations, features, means, or instructions for communicating, as part of a random access procedure, one or more signals with the network entity during the first duration, the first duration including a random access occasion.

In some examples of the method, apparatuses, and non-transitory computer-readable medium described herein, the set of periodicities includes a first period between the first duration and an additional first duration different from the first duration and a second period between consecutive first durations, the first period different from the second period, the first duration aligned outside of the second duration based on the first period being different than the second period.

In some examples of the method, apparatuses, and non-transitory computer-readable medium described herein, the set of periodicities includes a first period between consecutive first durations that may be the same as a third period between consecutive second durations, the first duration aligned outside of the second duration based on the first period being the same as the third period.

In some examples of the method, apparatuses, and non-transitory computer-readable medium described herein, the first period and the third period may be based on a set of quantized values or may be derived from a fraction of two integers.

In some examples of the method, apparatuses, and non-transitory computer-readable medium described herein, the first duration may be aligned outside of the second duration based on a first starting offset of a set of starting offsets, the first starting offset including an offset between a first time associated with the first duration and a second time associated with the second duration, the set of starting offsets including the first starting offset being preconfigured at the UE, indicated in the control message, or both.

In some examples of the method, apparatuses, and non-transitory computer-readable medium described herein, the first duration may be aligned outside the second duration based on a start time for an ON-duration of a DRX cycle that may be associated with the UE.

Some examples of the method, apparatuses, and non-transitory computer-readable medium described herein may further include operations, features, means, or instructions for receiving, from the network entity, a second control message, where performing the one or more operations during the first duration and communicating with the network entity may be based on receiving the second control message.

In some examples of the method, apparatuses, and non-transitory computer-readable medium described herein, the second control message includes a wakeup signal.

In some examples of the method, apparatuses, and non-transitory computer-readable medium described herein, a start time of the first duration may be based on a timing reference value corresponding to a system frame number associated with the UE, the first duration aligned outside the second duration based on the start time of the first duration.

A method for wireless communication is described. The method may include determining a set of periodicities associated with a first duration of a set of first durations for a UE to perform signaling and measurement, the first duration aligned outside a second duration of a set of second durations for the UE to receive data based on the set of periodicities, transmitting a control message indicating the set of periodicities associated with the first duration of the set of first durations to the UE, and communicating with the UE based on transmitting the control message indicating the set of periodicities.

An apparatus for wireless communication is described. The apparatus may include a processor, memory coupled with the processor, and instructions stored in the memory. The instructions may be executable by the processor to cause the apparatus to determine a set of periodicities associated with a first duration of a set of first durations for a UE to perform signaling and measurement, the first duration aligned outside a second duration of a set of second durations for the UE to receive data based on the set of periodicities, transmit a control message indicating the set of periodicities associated with the first duration of the set of first durations to the UE, and communicate with the UE based on transmitting the control message indicating the set of periodicities.

Another apparatus for wireless communication is described. The apparatus may include means for determining a set of periodicities associated with a first duration of a set of first durations for a UE to perform signaling and measurement, the first duration aligned outside a second duration of a set of second durations for the UE to receive data based on the set of periodicities, means for transmitting a control message indicating the set of periodicities associated with the first duration of the set of first durations to the UE, and means for communicating with the UE based on transmitting the control message indicating the set of periodicities.

A non-transitory computer-readable medium storing code for wireless communication is described. The code may include instructions executable by a processor to determine a set of periodicities associated with a first duration of a set of first durations for a UE to perform signaling and measurement, the first duration aligned outside a second duration of a set of second durations for the UE to receive data based on the set of periodicities, transmit a control message indicating the set of periodicities associated with the first duration of the set of first durations to the UE, and communicate with the UE based on transmitting the control message indicating the set of periodicities.

In some examples of the method, apparatuses, and non-transitory computer-readable medium described herein, communicating with the UE may include operations, features, means, or instructions for refraining from communicating with the UE during the first duration based on the first duration including a MG.

Some examples of the method, apparatuses, and non-transitory computer-readable medium described herein may further include operations, features, means, or instructions for transmitting a generic SSB to the UE during the first duration, where communicating with the UE may be based on transmitting the generic SSB.

In some examples of the method, apparatuses, and non-transitory computer-readable medium described herein, the generic SSB indicates a slot offset and a symbol offset corresponding to a system frame number associated with the UE, the slot offset and the symbol offset based on the first duration being aligned outside of the second duration.

In some examples of the method, apparatuses, and non-transitory computer-readable medium described herein, communicating with the UE may include operations, features, means, or instructions for refraining from transmitting a generic SSB to the UE during the first duration based on a priority of the generic SSB, the first duration associated with the generic SSB, the priority of the generic SSB lower than a priority of a cell defining SSB and transmitting the cell defining SSB to the UE during the first duration based on the priority of the generic SSB being lower than the priority of the cell defining SSB, where communicating with the UE may be based on refraining from transmitting the generic SSB and transmitting the cell defining SSB.

In some examples of the method, apparatuses, and non-transitory computer-readable medium described herein, communicating with the UE may include operations, features, means, or instructions for communicating, as part of a random access procedure, one or more signals with the UE during the first duration, the first duration including a random access occasion.

In some examples of the method, apparatuses, and non-transitory computer-readable medium described herein, the set of periodicities includes a first period between the first duration and an additional first duration different from the first duration and a second period between consecutive first durations, the first period different from the second period, the first duration aligned outside of the second duration based on the first period being different than the second period.

In some examples of the method, apparatuses, and non-transitory computer-readable medium described herein, the set of periodicities includes a first period between consecutive first durations that may be the same as a third period between consecutive second durations, the first duration aligned outside of the second duration based on the first period being the same as the third period.

In some examples of the method, apparatuses, and non-transitory computer-readable medium described herein, the first period and the third period may be based on a set of quantized values or may be derived from a fraction of two integers.

In some examples of the method, apparatuses, and non-transitory computer-readable medium described herein, the first duration may be aligned outside of the second duration based on a first starting offset of a set of starting offsets, the first starting offset including an offset between a first time associated with the first duration and a second time associated with the second duration, the set of starting offsets including the first starting offset being preconfigured at the UE, indicated in the control message, or both.

In some examples of the method, apparatuses, and non-transitory computer-readable medium described herein, the first duration may be aligned outside the second duration based on a start time for an ON-duration of a DRX cycle that may be associated with the UE.

Some examples of the method, apparatuses, and non-transitory computer-readable medium described herein may further include operations, features, means, or instructions for transmitting a second control message to the UE, where communicating with the UE may be based on transmitting the second control message.

In some examples of the method, apparatuses, and non-transitory computer-readable medium described herein, the second control message includes a wakeup signal.

In some examples of the method, apparatuses, and non-transitory computer-readable medium described herein, a start time of the first duration may be based on a timing reference value corresponding to a system frame number associated with the UE, the first duration aligned outside the second duration based on the start time of the first duration.

BRIEF DESCRIPTION OF THE DRAWINGS

FIGS. 13 through 18 illustrate flowcharts showing methods that support aligning time durations for signaling and measurement in accordance with one or more aspects of the present disclosure.

DETAILED DESCRIPTION

Figure 1:
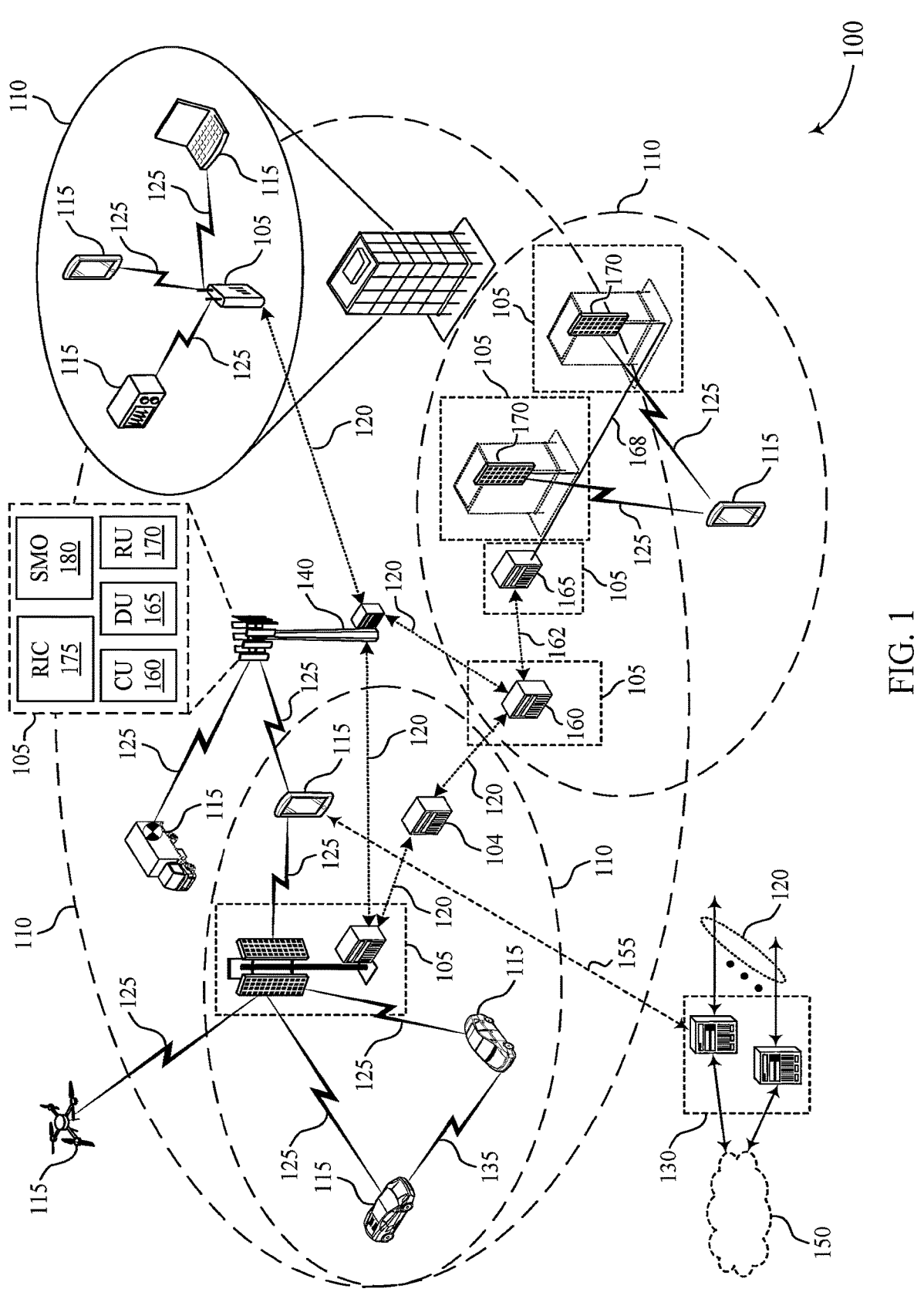
FIG. 1 illustrates an example of a wireless communications system that supports aligning time durations for signaling and measurement in accordance with one or more aspects of the present disclosure.

Some wireless communications systems, such as extended reality (XR) systems, may have transmissions between a user equipment (UE) and a network entity (e.g., a base station) that follow a somewhat uniform or periodic pattern. For example, XR applications may have traffic bursts that have a uniform or periodic pattern, where the XR applications may include cloud gaming applications, virtual reality (VR) split rendering applications, augmented reality (AR) split computation applications, and the like. Further, a UE in some cases may be configured with one or more measurement gaps (MG) for performing measurements, one or more random access occasions, or one or more durations to communicate signals with a network entity, such as synchronization signal blocks (SSB). In some cases, the regular or periodic pattern of the traffic may have a periodicity that does not correspond with an integer value of possible starting locations for the MGs, random access occasions, or signal communications, resulting in interference and delays at the UE.

A wireless communications system may include techniques enabling alignment of one or more time durations for signaling and measurement with one or more periodic signals, including those associated with XR traffic. For example, a UE may receive control signaling indicating a set of non-uniform periods for the time durations. Additionally, or alternatively, the control signaling may indicate a non-integer period of time durations, where the non-integer period may be based on a fraction of two integers or may otherwise be quantized, and may in some examples be a same period as the XR traffic. The UE may alternatively align the time durations outside second time durations for XR traffic using one or more offsets, where the offsets may be configured using information stored in memory or indicated in the control signaling. In some examples, the UE may configure a periodicity of the time durations based on a discontinuous reception (DRX) cycle at the UE. For example, the UE may offset the one or more durations based on a start time of each ON-duration of a DRX configuration, where the DRX configuration may be already aligned with XR traffic.

In some examples, the time durations may be associated with a MG, where the control signaling may indicate an MG repeating periodicity (MGRP). Additionally, or alternatively, the network entity may align one or more random access occasions or signaling using a non-uniform period, a rational period, one or more offsets, a DRX configuration, etc. In some cases, the signaling may include non-cell defining (NCD) SSBs. In some examples, each SSB may include one or more fields to indicate an offset with respect to frames of an SFN, and may be associated with a priority. In some cases, the UE may receive dynamic signaling to align the one or more time durations. In some examples, the UE may update a timing reference value associated with a system frame number (SNF) to align the one or more time durations with the XR traffic.

Aspects of the disclosure are initially described in the context of wireless communications systems. Aspects of the disclosure are further illustrated by and described with reference to wireless communications systems, timing diagrams, and process flows. Aspects of the disclosure are further illustrated by and described with reference to apparatus diagrams, system diagrams, and flowcharts that relate to aligning time durations for signaling and measurement.

FIG. 1 illustrates an example of a wireless communications system 100 that supports aligning time durations for signaling and measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100. which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support aligning time durations for signaling and measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by an SFN (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support XR devices. For example, a UE 115 may be an XR device, which may include a virtual reality (VR) device, an augmented reality device (AR), or a mixed reality (MR) device, where an MR device may include a combination of aspects from both VR devices and AR devices. In some examples, XR applications at a UE 115 may have traffic bursts that have a uniform or periodic pattern of a first periodicity. In some cases, XR transmissions may have a low latency and may include delay-sensitive processes at a UE 115 (e.g., to improve quality of user experience). XR transmissions may also include high data throughput (e.g., high data rate) which may consume a large amount of power. For example, a network entity 105 may transmit large data packets, such as video frames, to a UE 115. Further, a UE 115 in some cases may be configured with a DRX configuration, in which the UE transitions to a power-saving sleep state between active times where the UE monitors for communications from the network entity 105 (e.g., may monitor a physical downlink control channel (PDCCH) for one or more transmissions). In some examples, an active time may include an ON-duration.

In some examples, a UE 115 may be an example of a reduced capability UE (e.g., a RedCap device). For example, a UE 115 may be a RedCap device designed to achieve lower cost, reduced complexity, longer battery life, small form factor etc. In some examples, an XR device may be a RedCap device (e.g., wearable device, such as AR glass). In some cases, a RedCap UE 115 may support narrow BWs, resources, and channels. In some cases, a network entity 105 may configure a RedCap UE 115 with one or more BWPs corresponding the narrow BWs, resources, and channels. For example, the network entity 105 may configure separate initial active DL or UL BWPS for the RedCap UE 115 to use during and after initial access. Additionally, or alternatively, the network entity 105 may configure a UE-specific DL or UL BWP for a connected mode RedCap UE via RRC signaling.

In some examples, a UE 115, such as a RedCap UE or XR UE, may receive one or more SSBs from a network entity 105. In some examples, an SSB may be associated with one network entity 105, or multiple network entities 105. For example, an SSB may be a cell defining (CD) SSB (e.g., cell-specific), and may be configured for a single cell corresponding to a single network entity. By way of another example, an SSB may be an NCD SSB, which may be broadcast for multiple cells and network entities 105. In some examples, the network entity 105 may configure one or more generic SSBs (e.g., NCD SSBs) for a serving cell for the UE 115 that correspond to UE-specific BWPs. For example, a UE-specific DL BWP may lack support for CD SSBs. In some examples, NCD SSBs may be used for one or more measurements, handover procedures to another cell, and for synchronization with the network.

In some examples, a UE 115 may be configured with one or more MGs, where an MG may include a temporary suspension of communications between a UE 115 and a serving cell (e.g., with a network entity 105) for the UE 115 to perform one or more measurements or other processes. In some examples, measurements during a MG may be associated with inter-frequency handover, inter-RAT handover, FR2 receive beam search for intra-frequency handover, etc. In some cases, MGs may have a higher priority than one or more transmissions (e.g., physical uplink shared channel (PUSCH) or physical downlink shared channel (PDSCH) transmissions). Additionally, or alternatively, MGs may have a lower priority than one or more other transmissions (e.g., random access signaling). Additionally, or alternatively, a UE 115 may be configured to perform one or more communications with a network entity 105 during a duration of time in place of or in addition to an MG. For example, a UE 115 may be configured with one or more random access occasions, one or more durations to communicate signals with a network entity, such as SSBs (NCD or CD), or one or more other time durations. In some cases, MGs or communications at the UE 115 may be configured according to a uniform or regular periodicity. In some cases, the UE 115 may perform a handover procedure, where the handover procedure may include performing measurements during one or more MGs based on receiving SSBs and performing random access procedures during random access occasions as part of an access procedure with a neighboring cell.

In some examples, MGs or communications at the UE 115 may have a different periodicity compared to a periodicity of XR traffic, which may cause interference. For example, XR traffic may have a non-integer periodicity (e.g., 50/3 ms, 100/3 ms, 25/3 ms), whereas MG or communications between the UE 115 and a network entity 105 may have an integer periodicity (e.g., MGRP of 20 ms, 40 ms, 80 ms, 160 ms). A mismatch in periodicity may result in one or more interruptions, delays, or errors at the UE 115 or a network entity 105. For example, interruption of XR traffic by an MG with higher priority than the XR traffic may delay one or more video frames, where a UE 115 may be drop an XR transmission (e.g., video) after a delay threshold (e.g., 10 ms) or a quantity of delays. Additionally, a probability of collision between XR traffic and one or more communications (e.g., SSBs or random access signals) or an MG may be higher than a configured block-error rate (BLER) threshold at the UE 115 due to the mismatched periodicities. Further, the UE 115 may be configured with a DRX cycle to match the XR traffic, which may result in an ON-duration with higher priority than an MG or other communications, which may interrupt a handover procedure and result in a UE 115 falling out of sync with the wireless communications system 100, losing mobility by missing or delaying one or more handover procedures (e.g., by missing MGs or SSB communications), as well as failed access procedures (e.g., by missing random access occasions). In some cases, a UE 115 may downsample to mitigate mismatched periodicities, but downsampling may result in poor performance.

As described herein, the wireless communications system 100 may include techniques enabling alignment of one or more time durations for signaling and measurement (e.g., MGs, SSBs, or random access occasions) outside of XR traffic as described with reference to FIGS. 2-4. For example, a UE 115 may receive control signaling indicating a set of non-uniform periods, a rational period matching an XR traffic period, or one or more offsets to align the time durations outside of the XR traffic. In some examples, a network entity 105 may configure a periodicity of the time durations based on a DRX cycle (e.g., a discontinuous reception cycle) at the UE 115. In some cases, the time durations may be associated with a MG, where the control signaling may indicate an MGRP (e.g., a MG repeating periodicity). Additionally, or alternatively, the network entity 105 may align one or more random access occasions or signaling using a non-uniform period, a rational period, one or more offsets, a DRX configuration, etc. In some cases, the signaling may include NCD SSBs (e.g., non-cell defining SSBs). In some examples, each SSB may include one or more fields to indicate an offset with respect to frames of an SFN, and may be associated with a priority. In some cases, the UE 115 may receive dynamic signaling from the network entity 105 to align the one or more time durations. In some examples, the UE 115 may update a timing reference value associated with an SFN to align the one or more time durations with the XR traffic.

Figure 2:
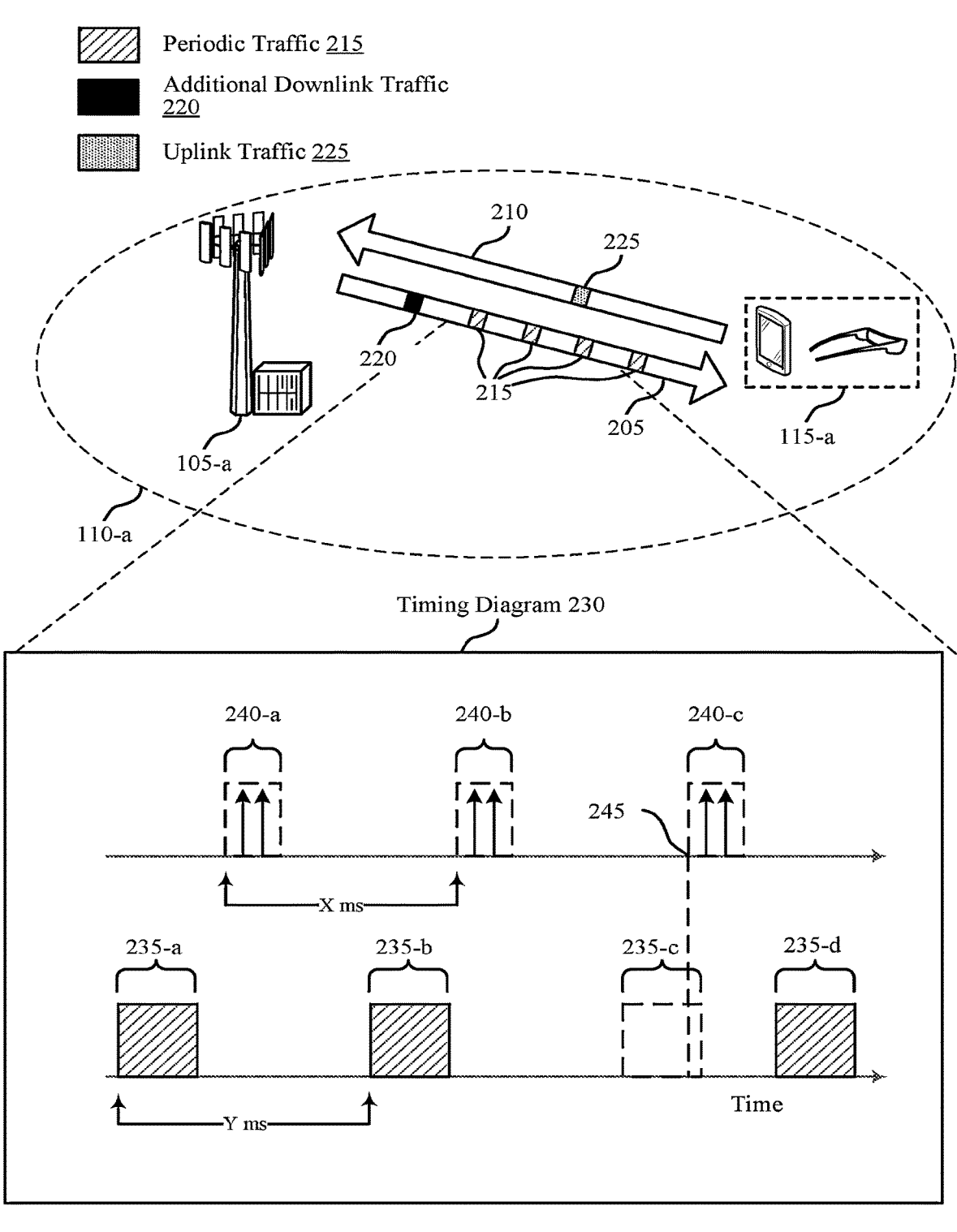
FIG. 2 illustrates an example of a wireless communications system that supports aligning time durations for signaling and measurement in accordance with one or more aspects of the present disclosure.

FIG. 2 illustrates an example of a wireless communications system 200 that supports aligning time durations for signaling and measurement in accordance with one or more aspects of the present disclosure. In some examples, the wireless communications system 200 may implement, or be implemented by, aspects of the wireless communications system 100. For example, the wireless communications system 200 may include a network entity 105-a with a coverage area 110-a and a UE-115-a, which may represent examples of the network entities 105 with coverage areas 110 and the UEs 115, respectively, as described with reference to FIG. 1. In some examples, the network entity 105-*a* and the UE 115-*a* may exchange control information, data, or both using a downlink communication link 205 and an uplink communication link 210. For example, the network entity 105-*a* may transmit periodic traffic 215, which may represent one or more XR traffic bursts as described with reference to FIG. 1, as well as additional downlink traffic 220. In some examples, the UE 115-*a* may perform one or more operations or communications based on the periodic traffic 215 or the additional downlink traffic 220. For example, the UE 115-*a* may transmit uplink traffic 225 using the uplink communication link 210. In some examples, the uplink traffic 225 and the additional downlink traffic 220 may include one or more SSB signaling, random access signaling, or other signaling (e.g., as part of a handover procedure). In some cases, the additional downlink traffic 220 may represent RRC signaling for configuring the UE 115-*a*. In some cases, the UE 115-*a* may represent an XR device as described with reference to FIG. 1, such as a RedCap device.

In some examples, the UE 115-*a* may receive the periodic traffic 215 and may perform the operations and communications as shown in a timing diagram 230. For example, the timing diagram 230 may include first durations 235-*a* through 235-*c*. where the first durations 235 may be associated with one or more MGs, SSBs, or random access occasions as described with respect to FIG. 1. The timing diagram 230 may also include one or more second durations 240-*a* through 240-*c*, where the second durations 240 may represent intervals where periodic traffic 215 (e.g., burst traffic) is received at the UE 115-*a*. For example, the second durations 240 may be configured for communicating XR burst traffic. In some examples, the first durations 235 and the second durations 240 may be defined by one or more periodicities. For example, the UE 115-*a* may receive the periodic traffic 215 at the second durations 240 according to a periodicity X, and may perform one or more operations or communications during the first durations 235 according to a periodicity Y. In some cases, the periodicity X may not align with the periodicity Y, which may result in one or more interruptions or delays due to interference between MGs, SSBs, random access occasions, and the periodic traffic 215 as described with reference to FIG. 1. For example, the first duration 235-*c* may overlap in time with the second duration 240-*c* as shown at 245. In some cases, the periodicity X may be a non-integer periodicity and the periodicity Y may be an integer periodicity.

As described herein, the UE 115-*a* may use one or more techniques for aligning the first durations 235 before or after the second durations 240 to avoid interference between operations and communications and XR traffic. For example, the network entity 105 may transmit a control message in the additional downlink traffic 220 indicating one or more periodicities, offsets, or other information to align the first durations 235 outside of the second durations 240. In some examples, the first durations 235 may represent one or more MGs, where the network entity 105-*a* may configure an MGRP of the UE 115-*a* to align the first durations 235 (e.g., MGs) before or after the second durations 240. Additionally, or alternatively, the first durations 235 may represent one or more random access occasions or SSBs (e.g., NCD SSBs), where the network entity 105-*a* or another network entity 105 may configure one or more random access occasions or SSB transmissions during the first durations 235 to avoid interference with the periodic traffic 215.

In some examples, the network entity 105-*a* and another network entity 105 may configure the UE 115-*a* and one or more signals to align the first durations 235 outside of the second durations 240 for a successful handover procedure. For example, the network entity 105-*a* may transmit a control message to the UE 115-*a* with an MGRP or multiple MGRPs to align one or more MGs outside of the second durations 240 (e.g., XR traffic in the periodic traffic 215), as well as configure the UE 115-*a* with one or more random access occasions outside the second durations 240. One or more SSBs of a target cell may additionally be configured by a neighboring network entity 105 to align SSB transmissions outside of the second durations 240. For example, the SSBs may represent NCD SSBs with configurable periodicities.

In some examples, the UE 115-*a* may successfully perform a handover procedure based on the configured periodicities. For example, the UE 115-*a* may receive one or more NCD SSBs from the target cell before or after the second durations 240. The UE 115-*a* may perform one or more measurements on the received NCD SSBs during an MG during the first duration 235-*d*, and may perform a random access procedure during one or more random access occasions during the first duration 235-*d*. Due to the alignment of the first duration 235-*d* outside of the second durations 240 (e.g., outside of the second duration 240-*c*), the UE 115-*a* may successfully perform the handover procedure without interrupting the handover operations or XR traffic. In such an example, a first duration 235 may include one or more of an SSB reception, an MG, a random access occasion, or a combination thereof.

In some cases, the alignment of the MGS, SSBs transmissions, and random access occasions may be achieved using any of the procedures described herein with respect to FIGS. 1-4. For example, the network entity 105-*a* may transmit the control message to configure the first durations 235 according to a set of non-uniform periodicities or start offsets as described with reference to FIG. 3A. Additionally, or alternatively, the network entity 105-*a* may configure the first durations 235 according to a non-integer periodicity as described with reference to FIG. 3B (e.g., X=Y). By way of another example, the network entity 105-*a* may configure the first durations 235 according to multiple configurations and offsets, where the UE 115-*a* may select one or more first durations 235 of the configurations that are aligned outside of the second durations 240 as described with reference to FIG. 3C. In some cases, the network entity 105-*a* may configure the first durations 235 with an offset in relation to a DRX cycle of the UE 115-*a*, where the DRX cycle may be aligned with the second durations 240 as described with reference to FIG. 3D. In some cases, the first durations 235 may be dynamically aligned or activated based on receiving additional downlink traffic 220 as described with respect to FIG. 3D. In some examples, the periodicities and configurations defined herein may be preconfigured at the UE 115-*a* (e.g., stored in memory of the UE 115-*a*).

In some cases, a network entity 105 associated with an SSB burst (e.g., a neighboring network entity 105) may configure SSBs of the SSB burst with additional information to mitigate issues resulting from misalignment within frames. In some cases, the first duration 235-*d* may represent a reception of a first SSB burst, where the first duration 235-*d* may be aligned according to a new periodicity or configuration as described herein. In some cases, aligning the first duration 235-*d* may result in one or more SSBs of the SSB burst being aligned in different system frames or half frames, which may result in errors at the UE 115-*a*. To mitigate a potential misalignment, the network entity 105 associated with the SSB burst may configure each SSB of the SSB burst to include an SFN field and a half-frame field, where the SFN field (e.g., 10 bits) may indicate a system frame corresponding to the SSB, and the half-frame indication may indicate a half-frame corresponding to the SSB. In some examples, one or more bits of each SSB payload may be repurposed to indicate the SFN field and the half-frame field. For example, a "PDCCH-ConfigSIB1" field, a "DRMS-TypeA-Position" field, and a "cellBarred" field may be repurposed. In some cases, the fields may be repurposed to indicate a slot offset and a symbol offset of a start time of the first duration 235-*d* (e.g., SSB burst) with relation to a time corresponding to an SFN to determine the location of each SSB. In some cases, the UE 115-*a* may use the SFN field or half frame field (or slot and symbol offsets) to determine the location of each SSB for performing measurements during an MG (e.g., for handover).

In some examples, a timing reference value may be updated to align the first durations 235 outside of the second durations 240. For example, the periodic traffic 215 may include XR traffic configured according to an SFN and a subframe number, which may define corresponding slots. The SFN may include any integer in the range of 0 and 1023 frames, where the subframe number may include any integer in the range of 0 and 9 frames. The first durations 235 may include one or more periodic MGs, SSB transmissions, or random access occasions as described herein, and may be configured according to a reference time of [(SFN×10)+subframe number], which may be repeated every 10.240 ms, where 10,240 ms may constitute a hyper frame period. In some cases, the integer hyper frame period of 10,240 ms may not align with the non-integer period of the second durations 240, which may lead to one or more first durations 235 falling out of sync again with second durations 240. For example, for 60 fps, a 0.6 frame period of XR traffic may remain at the end of the hyper frame (e.g., when the SFN returns to the integer 0), and for 120 fps, a 0.2 frame period of XR traffic may remain at the end of the hyper frame. The partial frame may cause a mismatch between periodic first durations 235 and the XR downlink frame arrival with the partial frame (e.g., for second durations 240). In some cases, a non-uniform C-DRX cycle may be configured to match the XR downlink frame arrival as described with reference to FIG. 3D, in which the UE 115-*a* may further miss a handover procedure and one or more MGs, random access occasions, or SSB transmissions based on the DRX cycle overlapping with one or more first durations 235.

To mitigate mismatch based on partial frames, the network entity 105-*a* may implement a timing reference value of $SFN_M$ which may be updated so that $SFN_M$=[($SFN_M$+1) mod M], where mod may represent the modulo operator. Thus, $SFN_M$ may be updated accordingly when SFN changes (e.g., due to an increment in time). In some cases, M may represent a modulo number, and may be configured as 1000 for XR applications to accommodate non-integer traffic. For example, $SFN_M$ may be configured accordingly as an integer between 0 and 999 frames, and the corresponding subframe number may be any integer between 0 and 9. Thus, the new reference time of [($SFN_M$×10)+subframe number] may repeat every 10,000 ms, allowing first durations 235 to align with the non-integer XR periodicity due to the lack of partial frames at the end of the hyper frame period for $SFN_M$, where the new reference time may be an integer multiple of the XR periodicity. In some cases, the network entity 105-*a* may configure the first durations 235 accordingly during any of the processes described herein with respect to FIGS. 1-4. In some cases, the new reference time described herein may align SSB bursts within a half frame. In some cases, the reference time may align the one or more first durations 235 according to a non-uniform C-DRX cycle matching the second durations 240. For example, the new reference time may align the first durations 235 outside of ON-durations of the non-uniform C-DRX cycle, enabling handover at the UE 115-*a*. In some cases, the new reference time may be preconfigured at the UE 115, or transmitted in a control message in additional downlink traffic 220 (e.g., in RRC signaling).

In some examples, the network entity 105-*a* may configure the UE 115-*a* to skip one or more MGs based on a priority of SSBs associated with the MG. For example, MGs associated with CD SSBs may have a higher priority than MGs associated with NCD SSBs. In some cases, the UE 115-*a* may receive the periodic traffic 215 during the second duration 240-*c* which may collide with an MG corresponding to the first duration 235-*c*, and the UE 115-*a* may determine to skip the MG based on the MG corresponding to an NCD SSB. Additionally, or alternatively, the UE 115-*a* may determine to perform the MG based on the MG corresponding to a CD SSB regardless of collisions with periodic traffic 215. In some cases, the periodicity of the CD SSB may be different from the periodicity of the MG or of the NCD SSB. In some examples, the UE 115-*a* may refrain from monitoring for NCD SSBs based on the priority. In some cases, the network entity 105-*a* or a neighboring network entity 105 may refrain from transmitting NCD SSBs to the UE 115-*a* based on the priority.

In some cases, the UE 115-*a* may receive one or more dynamic signals (e.g., DCI) in the additional downlink traffic 220, and may perform one or more operations or communications during the first durations 235 based on the dynamic signals. For example, the UE 115-*a* may monitor for one or more dynamic signals, and may wait to perform one or more first durations 235 until receiving a dynamic signal. Additionally, or alternatively, the UE 115-*a* may perform operations or communications during the first durations 235-*a* through 235-*c*. and may perform additional operations or communications during the first duration 235-*d* based on receiving a dynamic signal before the first duration 235-*d*.

In some cases, aligning MGs or communications such as random access occasions and SSB bursts outside of the periodic traffic 215 may result in successful handover procedures, faster and more reliable XR performance, as well as improved efficiency in communications due to less delays.

FIGS. 3A, 3B, 3C, and 3D illustrate examples of timing diagrams 301, 302, 303, and 304, respectively, that support aligning time durations for signaling and measurement in accordance with one or more aspects of the present disclosure. The timing diagrams 301, 302, 303, and 304 may represent timing of communications and operations between a network entity 105 and a UE 115 according to one or more first durations for measurements or communications aligned with one or more second durations for periodic signals as described with reference to FIGS. 1 and 2. In some examples, the FIGS. 3A-3D may include configurations for one or more first durations 310 corresponding to one or more MGs, SSB transmissions (e.g., NCD SSB bursts), or random access occasions, and one or more second durations 315 corresponding to periodic traffic (e.g., periodic XR bursts) as described with reference to FIG. 2. In some cases, a UE 115 may receive the periodic traffic during the second durations according to a period X representing a non-integer period. In some examples, the UE 115 may be a RedCap or XR UE as described with reference to FIGS. 1 and 2.

Figures 3A, 3B, 3C:
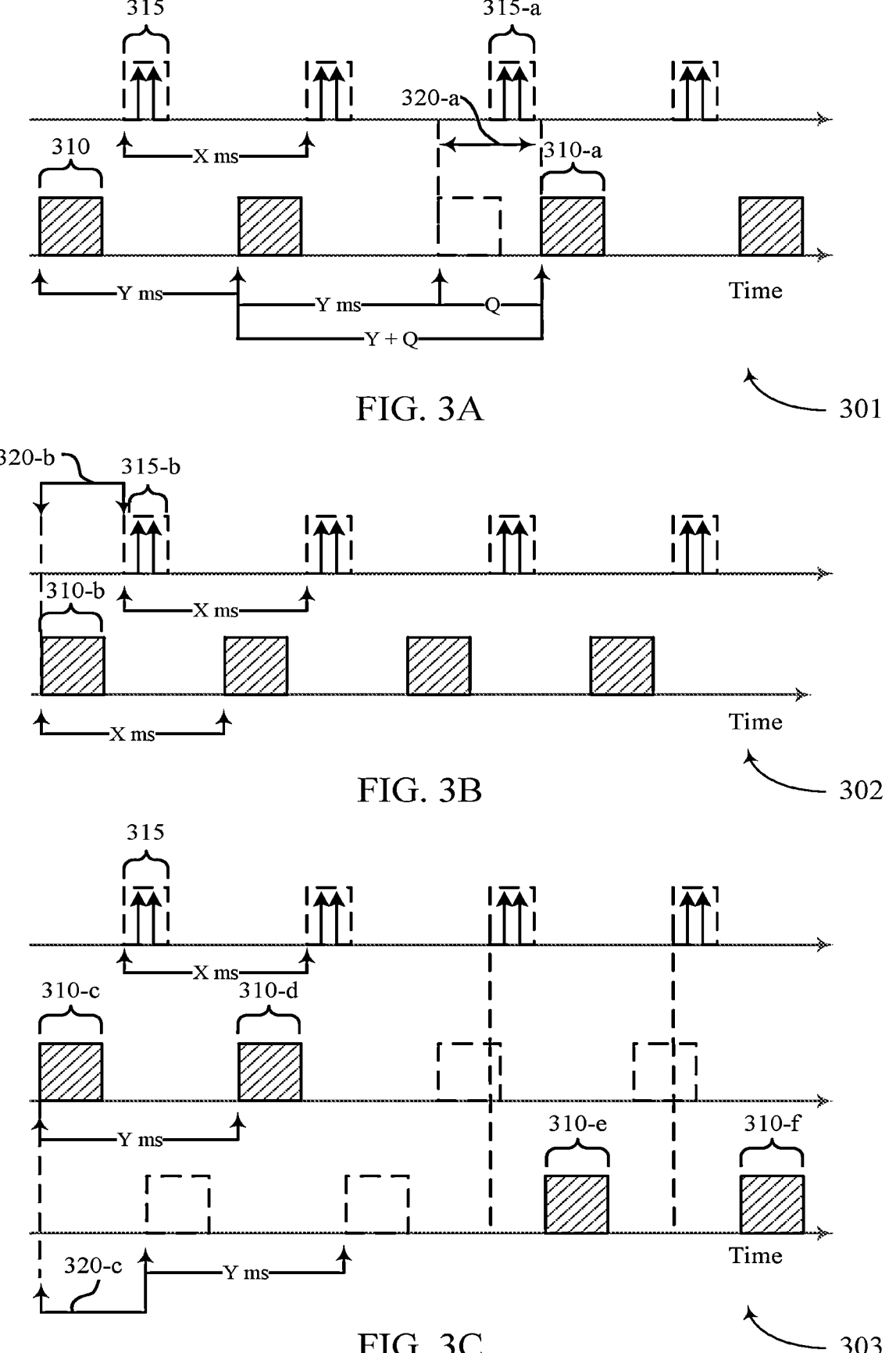
FIGS. 3A, 3B, 3C, and 3D illustrate examples of timing diagrams that support aligning time durations for signaling and measurement in accordance with one or more aspects of the present disclosure.

The timing diagram 301 of FIG. 3A may represent one or more configurations and signaling for adapting MG, SSB transmissions, or random access occasions to fall outside of periodic signaling (e.g., XR traffic) using explicit signaling. For example, a network entity 105 may configure one or more first durations 310 with one or more semi-static periods. In some examples, the network entity 105 may transmit a control message to the UE 115 indicating the one or more semi-static periods, where the one or more semi-static periods may include a pattern of periods Y, Y, and Y+Q, repeating, to avoid overlap with the second durations 315. In some examples, the period Y may be greater than the period X. For example, the first durations 310 may be configured according to a period of 33 ms, 33 ms, 34 ms, repeating, where the period X may be smaller than 33 ms.

In some examples, the one or more semi-static periods may delay or advance a first duration 310 to avoid overlap with a second duration 315. For example, a first duration 310-a may include a period of Y+Qms between the first duration 310-a and a previous first duration 310, which may result in the first duration 310-a taking place after a second duration 315-a. The new period for the first duration 310-c may thus avoid an overlap between the first duration 310-c and the second duration 315-a. Additionally, or alternatively, the control message may indicate a start time offset 320-a, which may similarly delay the first duration 310-a by Qms from a start time after the period of Yms. In some cases, the network entity 105 may transmit a control message to the UE 115 to configure the one or more first durations 310 with a period of Y, Y, and Y−Q, where the period Y may be smaller than the period X. Additionally, or alternatively, the first duration 310-a may be configured with an offset between the first duration 310-a and a nearest second duration 315, such as the second duration 315-a. In some cases, a UE 115 may be preconfigured with the pattern of periods Y, Y, and Y+Q or Y, Y, and Y−Q, or with the offset 320-a.

The timing diagram 302 of FIG. 3B may represent one or more configurations and signaling for adapting MG, SSB transmissions, or random access occasions to fall outside of periodic signaling (e.g., XR traffic) using explicit signaling. For example, a network entity 105 may transmit a control signal indicating a non-integer period for the first durations 310 matching the period X of the second durations 315. For example, both the first durations 310 and the second durations 315 may be configured according to a period of 100/3 ms. Additionally, or alternatively, the period X may be further quantized according to time (e.g., ms), slot boundary, or symbol boundary.

In some examples, the non-integer period X may result in first durations 310 avoiding overlap with second durations 315. For example, the first durations 310 may be configured with an offset 320-b between a start time of each first duration 310 and a start time of each second duration 315. In some cases, the offset 320-b may offset a first duration 310-b relative to a second duration 315-b as shown in FIG. 3B. In some examples, the offset 320-b may between a start time of each first duration 310 and a start time of each second duration 315 as shown. Additionally, or alternatively, the offset 320-b may be between a start time of each first duration 310 and an end time of each second duration 315, between an end time of each first duration 310 and a start time of each second duration 315, or between an end time of each first duration 310 and an end time of each second duration 315. In some examples, the first durations 310 may be aligned outside of the second durations 315 based on the offset 320-b and the period X for the first durations 310 and the second durations 315. In some cases, a UE 115 may be preconfigured with the offset 320-b.

The timing diagram 303 of FIG. 3C may represent signaling for adapting MG. SSB transmissions, or random access occasions to fall outside of periodic signaling (e.g., XR traffic) using implicit signaling. In some examples, the network entity 105 may transmit a control message to the UE 115 to configure one or more starting offsets 320-c for one or more configurations of first durations 310, where each configuration may include a same integer period Y. For example, a first configuration may include one or more first durations 310, including the first duration 310-c and the first duration 310-d, while a second configuration may include one or more first durations 310 including a first duration 310-e and a first duration 310-f. In some cases, the control message may indicate the first configuration to have a zero starting offset (e.g., 0 ms), and may indicate the second configuration to have an offset 320-c (e.g., 33 ms).

In some examples, the UE 115 may select or activate one or more first durations 310 based on the zero offset, the offset 320-c, and period Y to avoid overlap between first durations 310 and second durations 315. For example, the UE 115 may select the first duration 310-c and the first duration 310-d of the first configuration and zero offset, while refraining from selecting the other first durations of the first configuration due to a collision between one or more first durations 310 and one or more second durations 315. The UE 115 may similarly select the first duration 310-e and the first duration 310-f of the second configuration and the offset 320-c based on the collisions, and may refrain from selecting one or more first durations 310 of the second configuration. In some cases, selecting the first durations 310-c through 310-f may avoid interference between one or more MGs or random access occasions with periodic signaling of the second durations 315. In some examples, a neighboring network entity 105 may configure one or more SSBs according to the zero offset, the offset 320-c, and the period Y of the two configurations. In some cases, the network entity 105 may include additional offsets 320 in the control message for additional configurations, or the neighboring network entity 105 may configure SSBs according to the additional offsets 320, where the UE 115 may be configured to select or activate first durations 310 from the first and second configurations and additional configurations. In some cases, the UE 115 may be preconfigured with the zero offset, the offset 320-c, the period Y of the first two configurations as well as with the additional configurations.

Figure 3D:
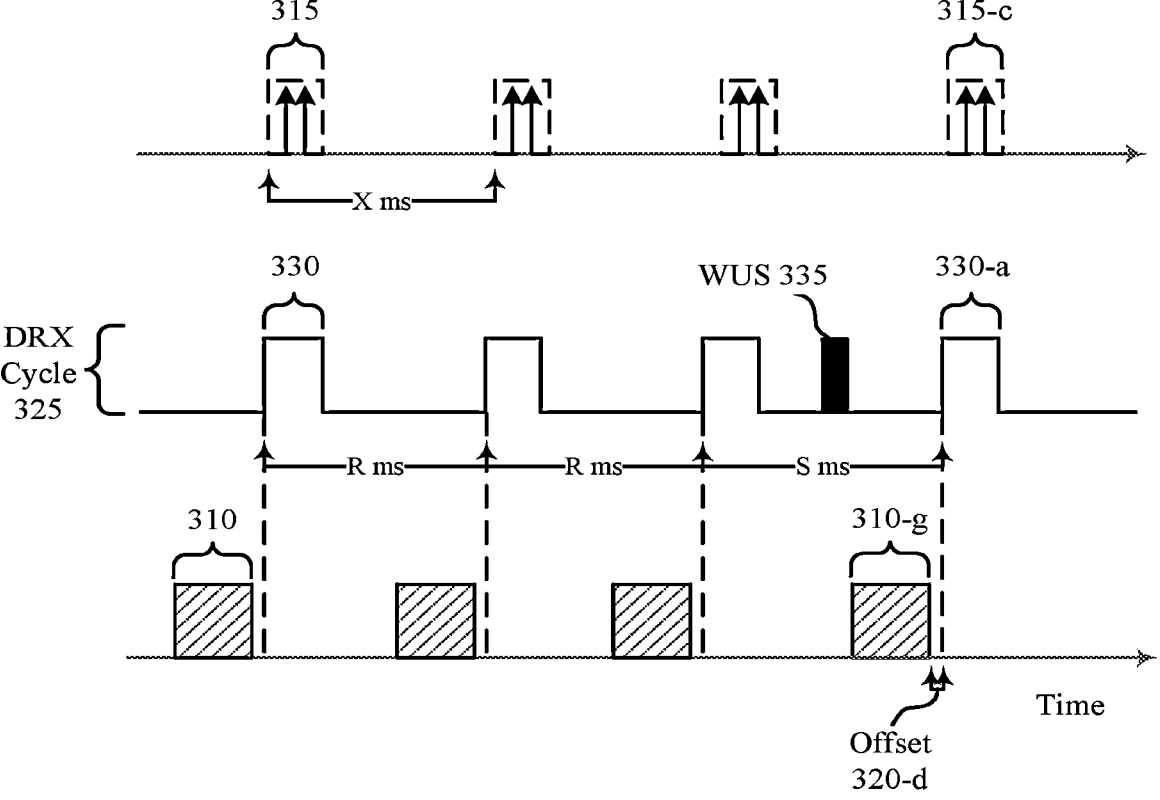

The timing diagram 304 of FIG. 3D may represent signaling for adapting MG. SSB transmissions, or random access occasions to align with a DRX cycle of a UE 115. For example, a network entity 105 may configure a UE 115 with a DRX cycle 325. In some examples, the DRX cycle 325 may represent a non-uniform connected mode DRX (C-DRX) cycle that may include one or more ON-durations 330. In some cases, the DRX cycle 325 may be aligned with the second durations 315. For example, the network entity 105 may employ one or more methods as described herein with respect to FIGS. 1-3D to align the ON-durations 330 with the second durations 315 so that the UE 115 may be in an "awake" state to receive XR traffic bursts. For example, the DRX cycle 325 may be configured according to a periodicity of R, R, S, repeating, to align the ON-durations 330 to include each second duration 315, where S>R. Additionally, or alternatively, the network entity 105 may configure the DRX cycle 325 so that the ON-durations 330 have a non-integer periodicity, include multiple DRX cycle configurations, or are defined by an offset similar to the procedures described with respect to FIGS. 3A-3C. In some examples, the network entity 105 may configure the ON-durations 330 according to an inner and outer cycle configuration. For example, an inner cycle may include an ON-duration and OFF duration before a next ON-duration, and an outer cycle may include three inner cycles, where the periodicity of inner cycles may match a non-uniform periodicity of R, R, S, repeating.

In some examples, the network entity 105 may configure one or more first durations 310 based on the DRX cycle 325. For example, the network entity 105 may transmit a control message indicating an offset 320-*d* between a start time of each ON-duration 330 and each first duration 310. In some examples, the network entity 105 may determine the offset 320-*d* so that each first duration 310 is aligned outside of an ON-duration 330. Due to the alignment of the ON-durations 330 with the second durations 315, the offset 320-*d* may subsequently align the first durations 310 outside of the second durations 315. For example, the first duration 310-*g* may be aligned outside of the ON-duration 330-*a* and the second duration 315-*c* as shown in FIG. 3D. Additionally, or alternatively, the network entity 105 may configure the first durations 310 with respect to a non-integer periodicity, multiple configurations, or an inner and outer cycle configuration as described herein (e.g., with an offset or similar period) to align with the DRX cycle 325. In some cases, the UE 115 may be preconfigured with offset 320-*d* and the DRX cycle 325.

In some examples, the network entity 105 may configure the first durations 310 in relation to a dynamic configuration for the DRX cycle 325. For example, the ON-duration 330-*a* may be configured to begin in response to the UE 115 receiving a dynamic indication, such as a WUS 335. The UE 115 may monitor for the WUS 335, and once receiving the WUS 335, may commence the ON-duration 330-*a* and transition to an active state. The network entity 105 may thus also configure the UE 115 to skip the one or more first durations 310 based on receiving the WUS 335. For example, after receiving the WUS 335, the UE 115 may refrain from performing measurements during an MG, monitoring for one or more SSBs, or communicating one or more random access messages during the first duration 310-*g*. In some cases, the UE 115 may refrain from performing a handover procedure based on receiving the WUS 335.

In some examples, the UE 115 may perform measurements during one or more MGs, receive one or more SSBs (e.g., NCD SSBs), or perform one or more random access operations as described with reference to FIG. 2 using the techniques described in FIGS. 3A-3D. Additionally, or alternatively, a network entity (e.g., of a target cell) may configure one or more SSBs to transmit to the UE (e.g., in NCD SSB bursts) during the one or more first durations 310.

Figure 4:
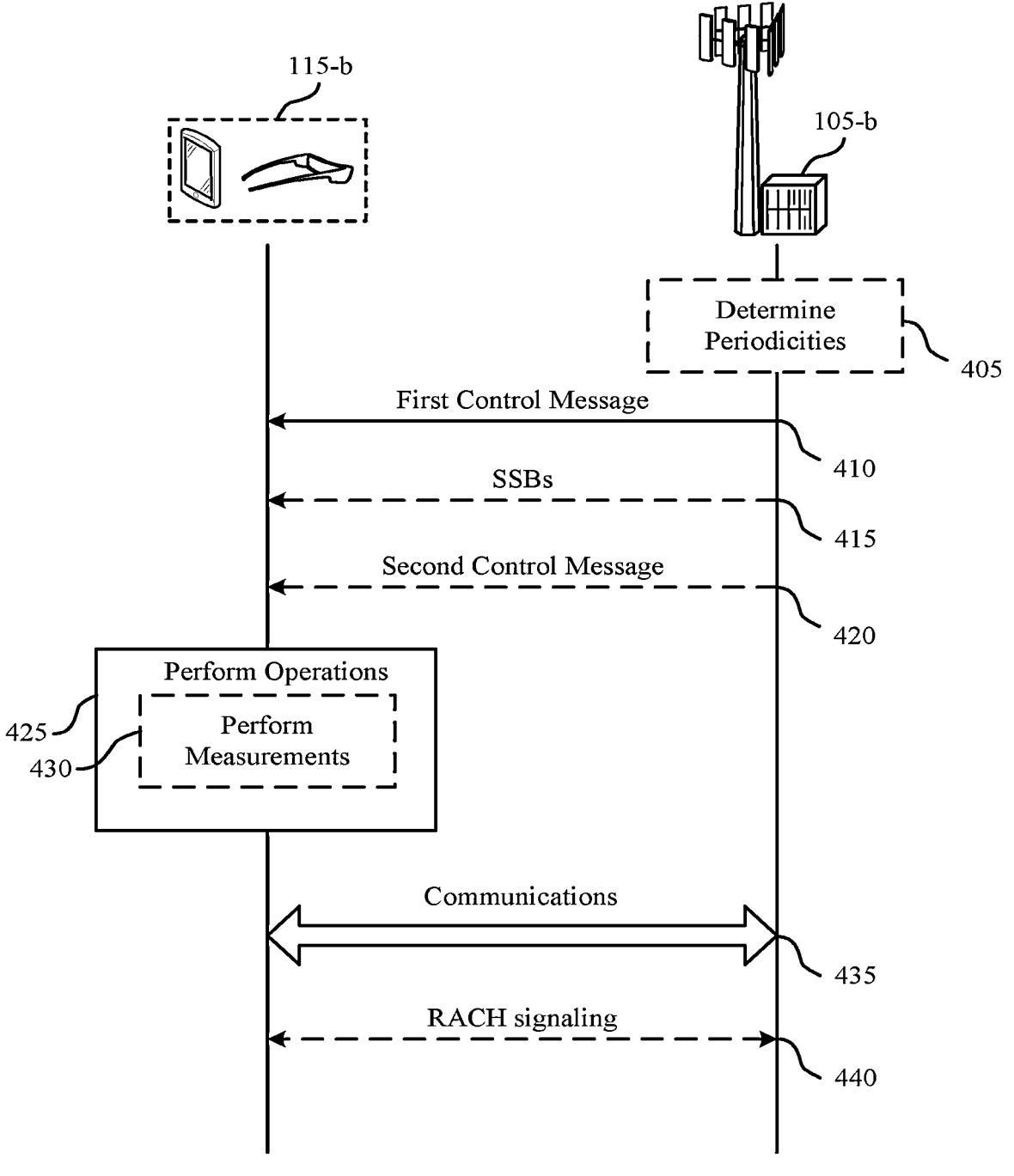
FIG. 4 illustrates an example of a process flow that supports aligning time durations for signaling and measurement in accordance with one or more aspects of the present disclosure.

FIG. 4 illustrates an example of a process flow 400 that supports aligning time durations for signaling and measurement in accordance with one or more aspects of the present disclosure. The process flow 400 may be implemented by aspects of the wireless communications systems 100 or 200, or the timing diagrams 301, 302, 303, and 304. For example, the process flow 400 may illustrate communication between a UE 115-*b* and a network entity 105-*b*, which may be examples of corresponding devices described herein, including with reference to FIGS. 1 through 3D.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

In some examples, the UE 115-*b* may be an example of an XR UE, such as VR goggles, or glasses. Additionally, or alternatively, the UE 115-*b* may be a mobile device. In some cases, the UE 115-*b* may be a RedCap UE as described with respect to FIGS. 1-3D.

At 405, the network entity 105-*b* may determine a set of periodicities associated with a first duration of a set of first durations for a UE to perform signaling and measurement, where the first duration may be aligned outside a second duration of a set of second durations for the UE to receive data based on the set of periodicities.

In some examples, the set of periodicities may include a first period between the first duration and an additional first duration different from the first duration and a second period between consecutive first durations, where the first period may be different from the second period. In some cases, the first duration may be aligned outside of the second duration based on the first period being different than the second period.

In some cases, the set of periodicities may include a first period between consecutive first durations that is the same as a third period between consecutive second durations, where the first duration may be aligned outside of the second duration based on the first period being the same as the third period. In some cases, the first period and the third period may be based on a set of quantized values or are derived from a fraction of two integers.

In some examples, the first duration may be aligned outside of the second duration based on a first starting offset of a set of starting offsets, where the first starting offset may include an offset between a first time associated with the first duration and a second time associated with the second duration as described with reference to FIGS. 2-3D. In some cases, the set of starting offsets may include the first starting offset being preconfigured at the UE 115-*b*, indicated in a control message, or both. In some examples, the first duration may be aligned outside the second duration based on a start time for an ON-duration of a DRX cycle that is associated with the UE 115-*b* as described with reference to FIG. 3D.

In some examples, a start time of the first duration may be based on a timing reference value corresponding to an SFN associated with the UE 115-*b*, where the first duration may be aligned outside the second duration based on the start time of the first duration as described with reference to FIG. 2.

At 410, the network entity 105-*b* may transmit, and the UE 115-*b* may receive, a control message indicating the set of periodicities associated with the first duration of the set of first durations for the UE to perform signaling and measurement.

At 415, the network entity 105-*b* may transmit, and the UE 115-*b* may receive, a generic SSB during the first duration. For example, the UE 115-*b* may receive one or more NCD SSBs. In some examples, the network entity 105-*b* may represent a neighboring network entity 105 as described with reference to FIG. 2, where the network entity 105-*b* may transmit the NCD SSBs as part of a handover procedure. In some examples, the NCD SSBs may indicate a slot offset and a symbol offset corresponding to an SFN associated with the UE 115-*b*, the slot offset and the symbol offset based on the first duration being aligned outside of the second duration as described with respect to FIG. 2. In some examples, the network entity 105-*b* may transmit the NCD SSBs before the first duration.

In some examples, the network entity 105-*b* may transmit, and the UE 115-*b* may receive, one or more CD SSBs, where the CD SSBs may have a higher priority than one or more NCD SSBs as described with reference to FIG. 2. For example, the UE 115-*b* may refrain from monitoring for, and the network entity 105-*b* (e.g., a neighboring network entity 105) may refrain from transmitting, one or more NCD SSBs to the UE 115-*b* during the first duration based on a priority of the NCD SSBs being lower than a priority of the CD SSBs, where the first duration may be associated with the NCD SSBs. Additionally, or alternatively, the network entity 105-*b* may transmit, and the UE 115-*b* may receive, one or more CD SSBs during the first duration based on the priority of the NCD SSBs being lower than the priority of the CD SSBs.

At 420, the network entity 105-*b* may transmit, and the UE 115-*b* may receive, a second control message. For example, the network entity 105-*b* may transmit one or more dynamic indications in the second control message. In some examples, the second control message may be a wakeup signal.

At 425, the UE 115-*b* may perform one or more operations during the first duration based on the first duration of the set of first durations being aligned outside the second duration of the set of second durations. For example, the first duration may be an MG for the UE to perform measurements. In some examples, at 430, the UE 115-*b* may perform one or more measurements during the first duration based on the first duration being aligned outside of the second duration and based on the first duration being an MG.

In some examples, the UE 115-*b* may perform the one or more operations during the first duration based on receiving the NCD SSBs at 415. For example, the UE 115-*b* may perform the one or more measurements on the NCD SSBs as part of a handover procedure. In some cases, the UE 115-*b* may perform the one or more operations during the first duration based on receiving the CD SSBs. For example, the UE 115-*b* may refrain from performing the one or more measurements at 430 during an MG based on the MG being associated with NCD SSBs as described with reference to FIG. 2. In some examples, performing the one or more operations and measurements during the first duration may be based on receiving the second control message. For example, the second control message may be a WUS, where the UE 115-*b* may refrain from performing measurements during the first duration after receiving the WUS as described with reference to FIG. 3D.

At 435, the UE 115-*b* and the network entity 105-*b* may communicate with each other based on the control message indicating the set of periodicities and the UE 115-*b* performing the one or more operations during the first duration. For example, network entity 105-*b* may refrain from communicating with the UE at 430 during the first duration based on the first duration comprising a MG.

By way of another example, at 440, the UE 115-*b* and the network entity 105-*b* may communicate, as part of a random access procedure, one or more signals during the first duration, where the first duration may be a random access occasion. In some examples, communicating at 435 may be based on the transmission of the NCD SSBs and the CS SSBs. For example, the UE 115-*b* may exchange one or more random access signals with the network entity 105-*b* as part of an access procedure during handover based on performing the measurements using the NCD SSBs. Additionally, or alternatively, the UE 115-*b* may exchange random access signals with the network entity 105-*b* based on receiving the CD SSB.

Figure 5:
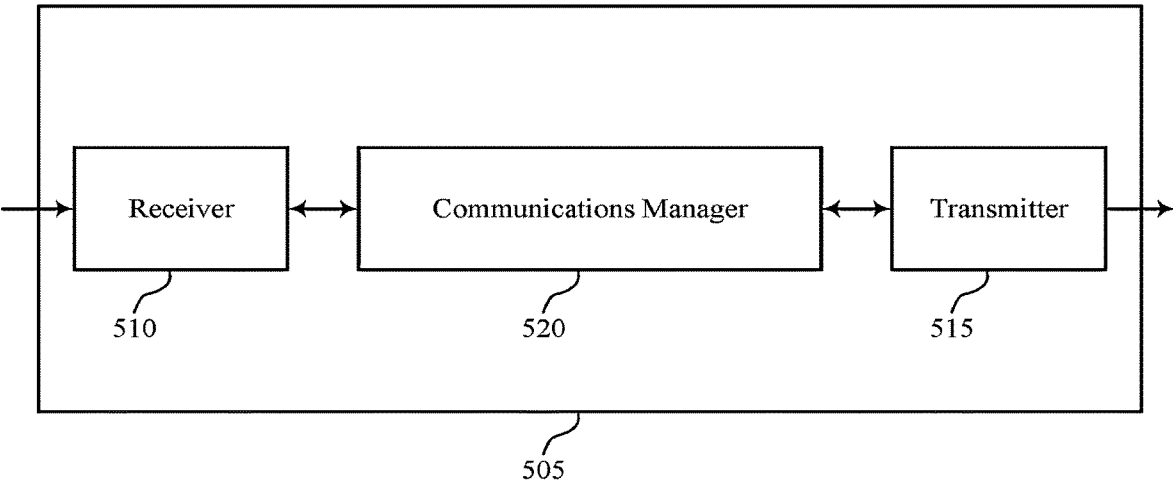
FIGS. 5 and 6 illustrate block diagrams of devices that support aligning time durations for signaling and measurement in accordance with one or more aspects of the present disclosure.

FIG. 5 illustrates a block diagram 500 of a device 505 that supports aligning time durations for signaling and measurement in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to aligning time durations for signaling and measurement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aligning time durations for signaling and measurement). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of aligning time durations for signaling and measurement as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The communications manager 520 may be configured as or otherwise support a means for performing one or more operations during the first duration based on the first duration of the set of first durations being aligned outside the second duration of the set of second durations. The communications manager 520 may be configured as or otherwise support a means for communicating with the network entity based on receiving the control message indicating the set of periodicities and performing the one or more operations during the first duration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for increased speed in handover procedures, faster and more reliable XR performance, as well as improved efficiency in communications due to less delays.

Figure 6:
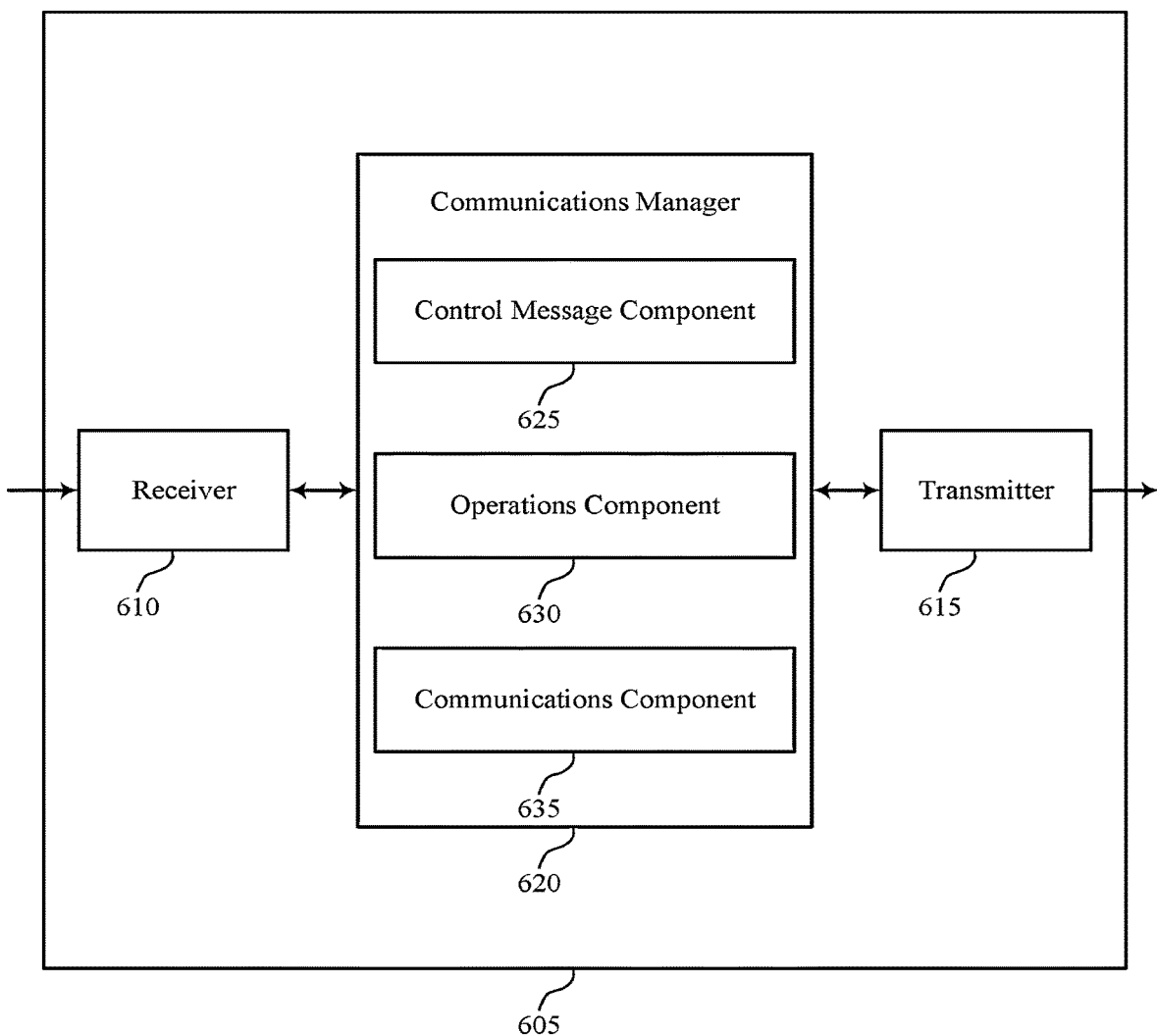

FIG. 6 illustrates a block diagram 600 of a device 605 that supports aligning time durations for signaling and measurement in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to aligning time durations for signaling and measurement). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aligning time durations for signaling and measurement). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of aligning time durations for signaling and measurement as described herein. For example, the communications manager 620 may include a control message component 625, an operations component 630, a communications component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control message component 625 may be configured as or otherwise support a means for receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations component 630 may be configured as or otherwise support a means for performing one or more operations during the first duration based on the first duration of the set of first durations being aligned outside the second duration of the set of second durations. The communications component 635 may be configured as or otherwise support a means for communicating with the network entity based on receiving the control message indicating the set of periodicities and performing the one or more operations during the first duration.

Figure 7:
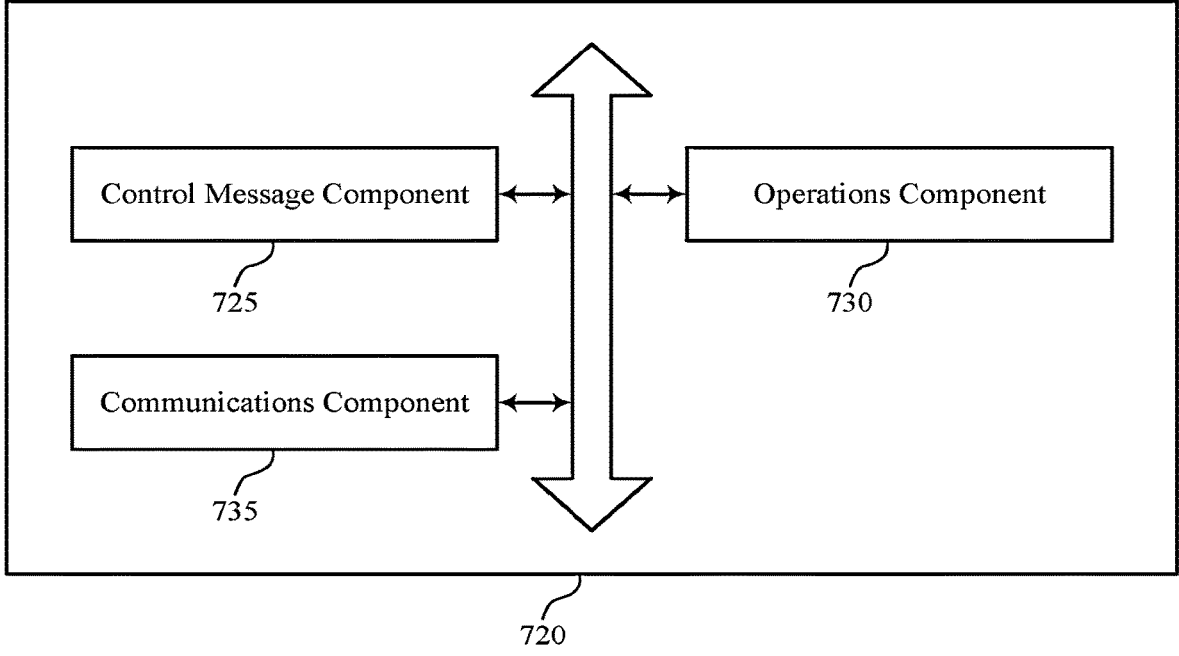
FIG. 7 illustrates a block diagram of a communications manager that supports aligning time durations for signaling and measurement in accordance with one or more aspects of the present disclosure.

FIG. 7 illustrates a block diagram 700 of a communications manager 720 that supports aligning time durations for signaling and measurement in accordance with one or more aspects of the present disclosure. The communications manager 720 may be an example of aspects of a communications manager 520, a communications manager 620, or both, as described herein. The communications manager 720, or various components thereof, may be an example of means for performing various aspects of aligning time durations for signaling and measurement as described herein. For example, the communications manager 720 may include a control message component 725, an operations component 730, a communications component 735, or any combination thereof. Each of these components may communicate, directly or indirectly, with one another (e.g., via one or more buses).

The communications manager 720 may support wireless communication at a UE in accordance with examples as disclosed herein. The control message component 725 may be configured as or otherwise support a means for receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations component 730 may be configured as or otherwise support a means for performing one or more operations during the first duration based on the first duration of the set of first durations being aligned outside the second duration of the set of second durations. The communications component 735 may be configured as or otherwise support a means for communicating with the network entity based on receiving the control message indicating the set of periodicities and performing the one or more operations during the first duration.

In some examples, to support performing the one or more operations during the first duration, the operations component 730 may be configured as or otherwise support a means for performing one or more measurements during the first duration based on the first duration being aligned outside of the second duration, the first duration including a MG.

In some examples, the communications component 735 may be configured as or otherwise support a means for receiving a generic SSB from the network entity during the first duration, where performing the one or more operations during the first duration and communicating with the network entity is based on receiving the generic SSB.

In some examples, the generic SSB indicates a slot offset and a symbol offset corresponding to an SFN associated with the UE, the slot offset and the symbol offset based on the first duration being aligned outside of the second duration.

In some examples, the communications component 735 may be configured as or otherwise support a means for receiving a cell defining SSB from the network entity based on a priority of a generic SSB being lower than a priority of the cell defining SSB, where performing the one or more operations during the first duration and communicating with the network entity is based on receiving the cell defining SSB.

In some examples, to support communicating with the network entity, the communications component 735 may be configured as or otherwise support a means for communicating, as part of a random access procedure, one or more signals with the network entity during the first duration, the first duration including a random access occasion.

In some examples, the set of periodicities includes a first period between the first duration and an additional first duration different from the first duration and a second period between consecutive first durations, the first period different from the second period, the first duration aligned outside of the second duration based on the first period being different than the second period.

In some examples, the set of periodicities includes a first period between consecutive first durations that is the same as a third period between consecutive second durations, the first duration aligned outside of the second duration based on the first period being the same as the third period.

In some examples, the first period and the third period are based on a set of quantized values or are derived from a fraction of two integers.

In some examples, the first duration is aligned outside of the second duration based on a first starting offset of a set of starting offsets, the first starting offset including an offset between a first time associated with the first duration and a second time associated with the second duration, the set of starting offsets including the first starting offset being preconfigured at the UE, indicated in the control message, or both.

In some examples, the first duration is aligned outside the second duration based on a start time for an ON-duration of a DRX cycle that is associated with the UE.

In some examples, the control message component 725 may be configured as or otherwise support a means for receiving, from the network entity, a second control message, where performing the one or more operations during the first duration and communicating with the network entity is based on receiving the second control message.

In some examples, the second control message includes a wakeup signal.

In some examples, a start time of the first duration is based on a timing reference value corresponding to an SFN associated with the UE, the first duration aligned outside the second duration based on the start time of the first duration.

Figure 8:
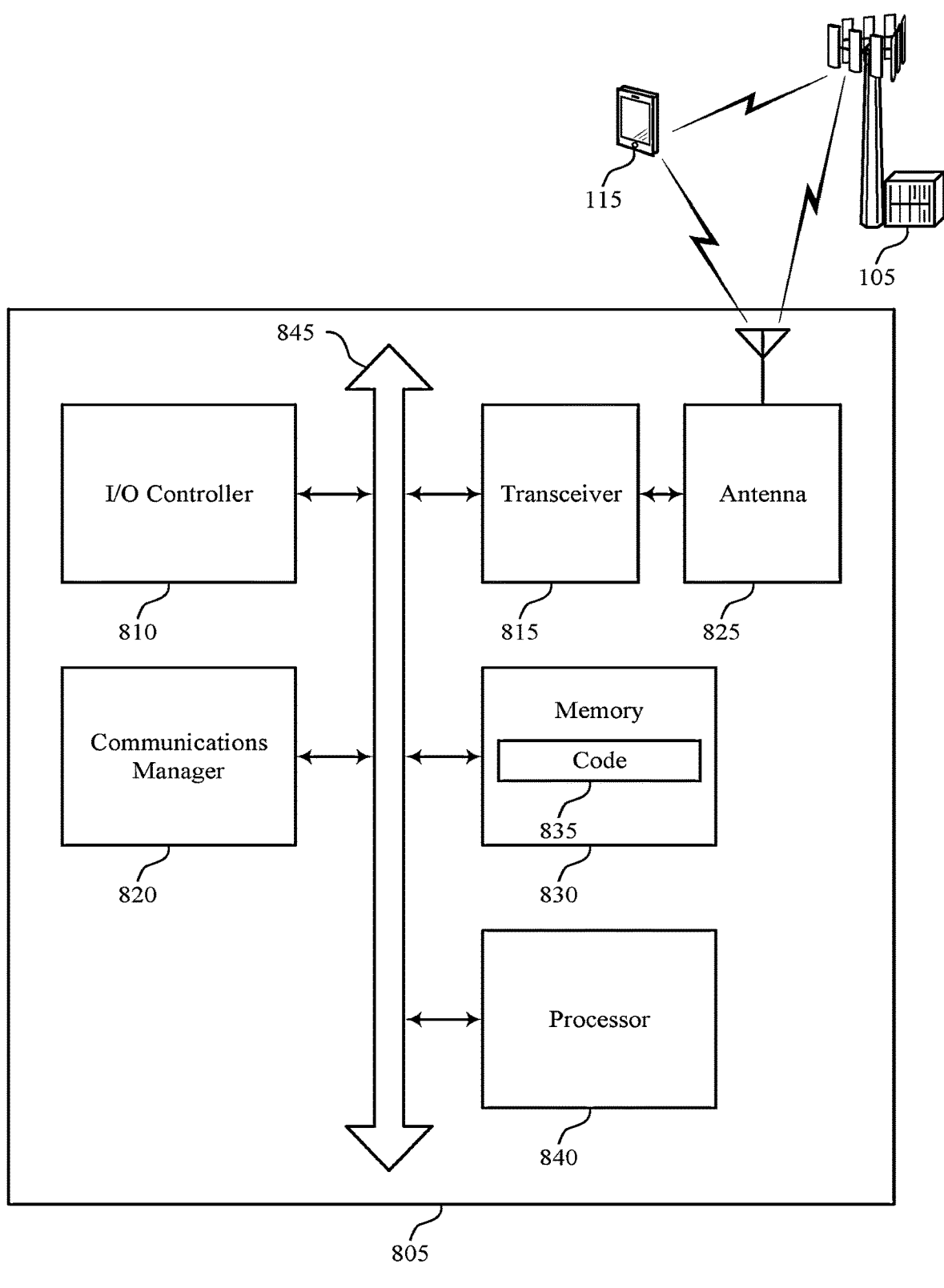
FIG. 8 illustrates a diagram of a system including a device that supports aligning time durations for signaling and measurement in accordance with one or more aspects of the present disclosure.

FIG. 8 illustrates a diagram of a system 800 including a device 805 that supports aligning time durations for signaling and measurement in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting aligning time durations for signaling and measurement). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The communications manager 820 may be configured as or otherwise support a means for performing one or more operations during the first duration based on the first duration of the set of first durations being aligned outside the second duration of the set of second durations. The communications manager 820 may be configured as or otherwise support a means for communicating with the network entity based on receiving the control message indicating the set of periodicities and performing the one or more operations during the first duration.

By including or configuring the communications manager 820 in accordance with examples as described herein, the device 805 may support techniques for increased reliability in handover procedures, faster and more reliable XR performance, as well as improved efficiency in communications due to less delays.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code

835, or any combination thereof. For example, the code 835 may include instructions executable by the processor 840 to cause the device 805 to perform various aspects of aligning time durations for signaling and measurement as described herein, or the processor 840 and the memory 830 may be otherwise configured to perform or support such operations.

Figure 9:
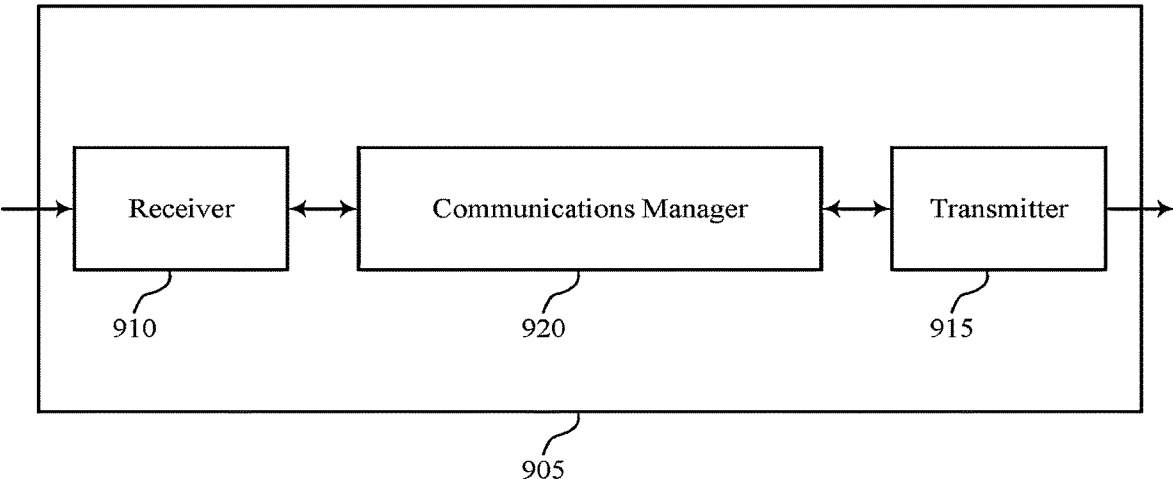
FIGS. 9 and 10 illustrate block diagrams of devices that support aligning time durations for signaling and measurement in accordance with one or more aspects of the present disclosure.

FIG. 9 illustrates a block diagram 900 of a device 905 that supports aligning time durations for signaling and measurement in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting. providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of aligning time durations for signaling and measurement as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 may be configured as or otherwise support a means for determining a set of periodicities associated with a first duration of a set of first durations for a UE to perform signaling and measurement, the first duration aligned outside a second duration of a set of second durations for the UE to receive data based on the set of periodicities. The communications manager 920 may be configured as or otherwise support a means for transmitting a control message indicating the set of periodicities associated with the first duration of the set of first durations to the UE. The communications manager 920 may be configured as or otherwise support a means for communicating with the UE based on transmitting the control message indicating the set of periodicities.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for increased speed in handover procedures, faster and more reliable XR performance, as well as improved efficiency in communications due to less delays.

Figure 10:
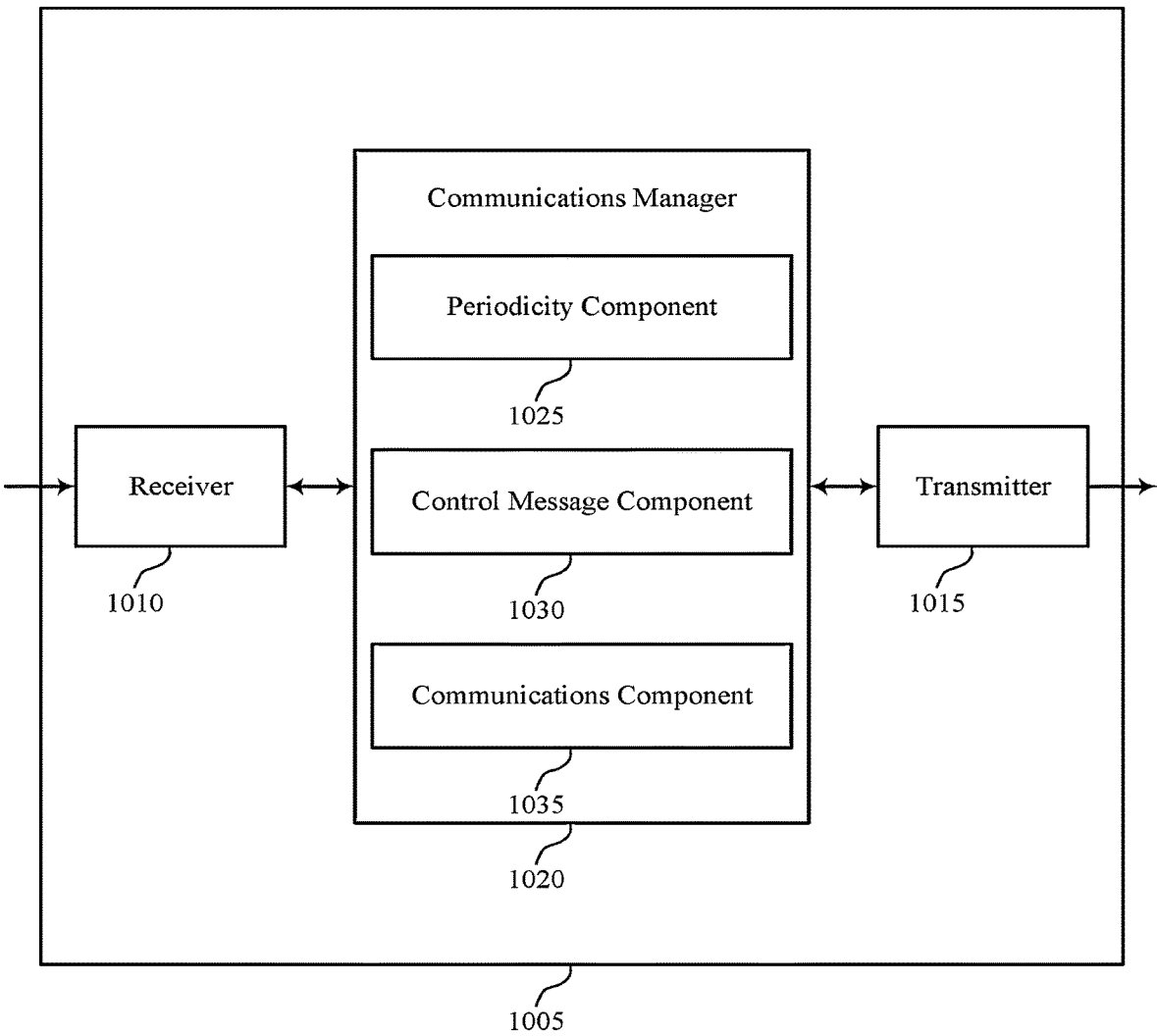

FIG. 10 illustrates a block diagram 1000 of a device 1005 that supports aligning time durations for signaling and measurement in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving. determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of aligning time durations for signaling and measurement as described herein. For example, the communications manager 1020 may include a periodicity component 1025, a control message component 1030, a communications component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The periodicity component 1025 may be configured as or otherwise support a means for determining a set of periodicities associated with a first duration of a set of first durations for a UE to perform signaling and measurement, the first duration aligned outside a second duration of a set of second durations for the UE to receive data based on the set of periodicities. The control message component 1030 may be configured as or otherwise support a means for transmitting a control message indicating the set of periodicities associated with the first duration of the set of first durations to the UE. The communications component 1035 may be configured as or otherwise support a means for communicating with the UE based on transmitting the control message indicating the set of periodicities.

Figure 11:
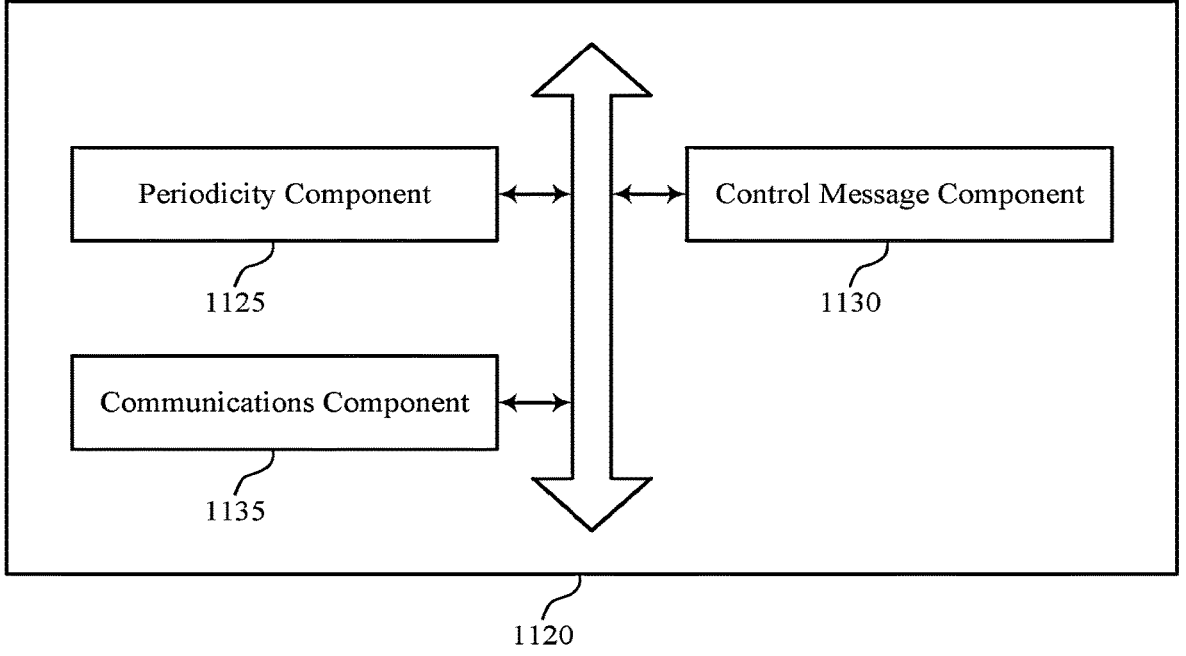
FIG. 11 illustrates a block diagram of a communications manager that supports aligning time durations for signaling and measurement in accordance with one or more aspects of the present disclosure.

FIG. 11 illustrates a block diagram 1100 of a communications manager 1120 that supports aligning time durations for signaling and measurement in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of aligning time durations for signaling and measurement as described herein. For example, the communications manager 1120 may include a periodicity component 1125, a control message component 1130, a communications component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The periodicity component 1125 may be configured as or otherwise support a means for determining a set of periodicities associated with a first duration of a set of first durations for a UE to perform signaling and measurement, the first duration aligned outside a second duration of a set of second durations for the UE to receive data based on the set of periodicities. The control message component 1130 may be configured as or otherwise support a means for transmitting a control message indicating the set of periodicities associated with the first duration of the set of first durations to the UE. The communications component 1135 may be configured as or otherwise support a means for communicating with the UE based on transmitting the control message indicating the set of periodicities.

In some examples, to support communicating with the UE, the communications component 1135 may be configured as or otherwise support a means for refraining from communicating with the UE during the first duration based on the first duration including a MG.

In some examples, the communications component 1135 may be configured as or otherwise support a means for transmitting a generic SSB to the UE during the first duration, where communicating with the UE is based on transmitting the generic SSB.

In some examples, the generic SSB indicates a slot offset and a symbol offset corresponding to an SFN associated with the UE, the slot offset and the symbol offset based on the first duration being aligned outside of the second duration.

In some examples, to support communicating with the UE, the communications component 1135 may be configured as or otherwise support a means for refraining from transmitting a generic SSB to the UE during the first duration based on a priority of the generic SSB, the first duration associated with the generic SSB, the priority of the generic SSB lower than a priority of a cell defining SSB. In some examples, to support communicating with the UE, the communications component 1135 may be configured as or otherwise support a means for transmitting the cell defining SSB to the UE during the first duration based on the priority of the generic SSB being lower than the priority of the cell defining SSB, where communicating with the UE is based on refraining from transmitting the generic SSB and transmitting the cell defining SSB.

In some examples, to support communicating with the UE, the communications component 1135 may be configured as or otherwise support a means for communicating, as part of a random access procedure, one or more signals with the UE during the first duration, the first duration including a random access occasion.

In some examples, the set of periodicities includes a first period between the first duration and an additional first duration different from the first duration and a second period between consecutive first durations, the first period different from the second period, the first duration aligned outside of the second duration based on the first period being different than the second period.

In some examples, the set of periodicities includes a first period between consecutive first durations that is the same as a third period between consecutive second durations, the first duration aligned outside of the second duration based on the first period being the same as the third period.

In some examples, the first period and the third period are based on a set of quantized values or are derived from a fraction of two integers.

In some examples, the first duration is aligned outside of the second duration based on a first starting offset of a set of starting offsets, the first starting offset including an offset between a first time associated with the first duration and a second time associated with the second duration, the set of starting offsets including the first starting offset being pre-configured at the UE, indicated in the control message, or both.

In some examples, the first duration is aligned outside the second duration based on a start time for an ON-duration of a DRX cycle that is associated with the UE.

In some examples, the control message component 1130 may be configured as or otherwise support a means for transmitting a second control message to the UE, where communicating with the UE is based on transmitting the second control message.

In some examples, the second control message includes a wakeup signal.

In some examples, a start time of the first duration is based on a timing reference value corresponding to an SFN associated with the UE, the first duration aligned outside the second duration based on the start time of the first duration.

Figure 12:
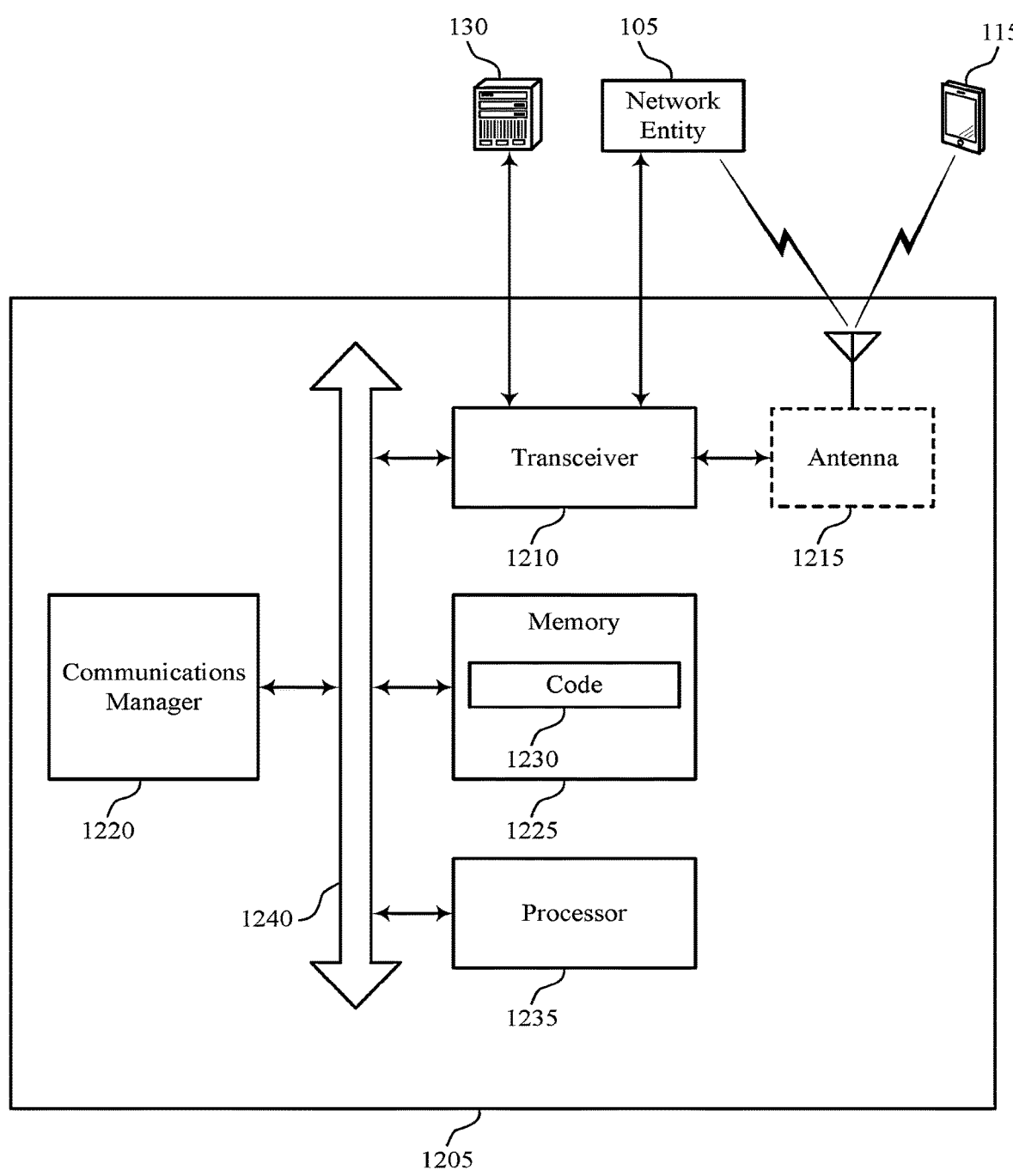
FIG. 12 illustrates a diagram of a system including a device that supports aligning time durations for signaling and measurement in accordance with one or more aspects of the present disclosure.

FIG. 12 illustrates a diagram of a system 1200 including a device 1205 that supports aligning time durations for signaling and measurement in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting aligning time durations for signaling and measurement). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device

1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 may be configured as or otherwise support a means for determining a set of periodicities associated with a first duration of a set of first durations for a UE to perform signaling and measurement, the first duration aligned outside a second duration of a set of second durations for the UE to receive data based on the set of periodicities. The communications manager 1220 may be configured as or otherwise support a means for transmitting a control message indicating the set of periodicities associated with the first duration of the set of first durations to the UE. The communications manager 1220 may be configured as or otherwise support a means for communicating with the UE based on transmitting the control message indicating the set of periodicities.

By including or configuring the communications manager 1220 in accordance with examples as described herein, the device 1205 may support techniques for increased reliability in handover procedures, faster and more reliable XR performance, as well as improved efficiency in communications due to less delays.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of aligning time durations for signaling and measurement as described herein, or the processor 1235 and the memory 1225 may be otherwise configured to perform or support such operations.

FIG. 13 illustrates a flowchart illustrating a method 1300 that supports aligning time durations for signaling and measurement in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations of 1305 may be performed in accordance with examples as disclosed herein. In some examples, aspects of the operations of 1305 may be performed by a control message component 725 as described with reference to FIG. 7.

At 1310, the method may include performing one or more operations during the first duration based on the first duration of the set of first durations being aligned outside the second duration of the set of second durations. The operations of 1310 may be performed in accordance with examples as disclosed herein. In some examples, aspects of the operations of 1310 may be performed by an operations component 730 as described with reference to FIG. 7.

At 1315, the method may include communicating with the network entity based on receiving the control message indicating the set of periodicities and performing the one or more operations during the first duration. The operations of 1315 may be performed in accordance with examples as disclosed herein. In some examples, aspects of the operations of 1315 may be performed by a communications component 735 as described with reference to FIG. 7.

FIG. 14 illustrates a flowchart illustrating a method 1400 that supports aligning time durations for signaling and measurement in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations of 1405 may be performed in accordance with examples as disclosed herein. In some examples, aspects of the operations of 1405 may be performed by a control message component 725 as described with reference to FIG. 7.

At 1410, the method may include performing one or more measurements during the first duration based on the first duration being aligned outside of the second duration, the first duration including a MG. The operations of 1410 may be performed in accordance with examples as disclosed herein. In some examples, aspects of the operations of 1410 may be performed by an operations component 730 as described with reference to FIG. 7.

At 1415, the method may include communicating with the network entity based on receiving the control message indicating the set of periodicities and performing the one or more measurements during the first duration. The operations of 1415 may be performed in accordance with examples as disclosed herein. In some examples, aspects of the operations of 1415 may be performed by a communications component 735 as described with reference to FIG. 7.

FIG. 15 illustrates a flowchart illustrating a method 1500 that supports aligning time durations for signaling and measurement in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations of 1505 may be performed in accordance with examples as disclosed herein. In some examples, aspects of the operations of 1505 may be performed by a control message component 725 as described with reference to FIG. 7.

At 1510, the method may include receiving a generic SSB from the network entity during the first duration. The operations of 1510 may be performed in accordance with examples as disclosed herein. In some examples, aspects of the operations of 1510 may be performed by a communications component 735 as described with reference to FIG. 7.

At 1515, the method may include performing one or more operations during the first duration based on the first duration of the set of first durations being aligned outside the second duration of the set of second durations, where performing the one or more operations during the first duration is based on receiving the generic SSB. The operations of 1515 may be performed in accordance with examples as disclosed herein. In some examples, aspects of the operations of 1515 may be performed by an operations component 730 as described with reference to FIG. 7.

At 1520, the method may include communicating with the network entity based on receiving the control message indicating the set of periodicities, performing the one or more operations during the first duration, and receiving the generic SSB. The operations of 1520 may be performed in accordance with examples as disclosed herein. In some examples, aspects of the operations of 1520 may be performed by a communications component 735 as described with reference to FIG. 7.

FIG. 16 illustrates a flowchart illustrating a method 1600 that supports aligning time durations for signaling and measurement in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, a control message indicating a set of periodicities associated with at least a first duration of a set of first durations for the UE to perform signaling and measurement, the first duration aligned outside of a second duration of a set of second durations for the UE to receive data based on the set of periodicities. The operations of 1605 may be performed in accordance with examples as disclosed herein. In some examples, aspects of the operations of 1605 may be performed by a control message component 725 as described with reference to FIG. 7.

At 1610, the method may include performing one or more operations during the first duration based on the first duration of the set of first durations being aligned outside the second duration of the set of second durations. The operations of 1610 may be performed in accordance with examples as disclosed herein. In some examples, aspects of the operations of 1610 may be performed by an operations component 730 as described with reference to FIG. 7.

At 1615, the method may include communicating, as part of a random access procedure, one or more signals with the network entity during the first duration, the first duration including a random access occasion. The operations of 1615 may be performed in accordance with examples as disclosed herein. In some examples, aspects of the operations of 1615 may be performed by a communications component 735 as described with reference to FIG. 7.

Figure 17:
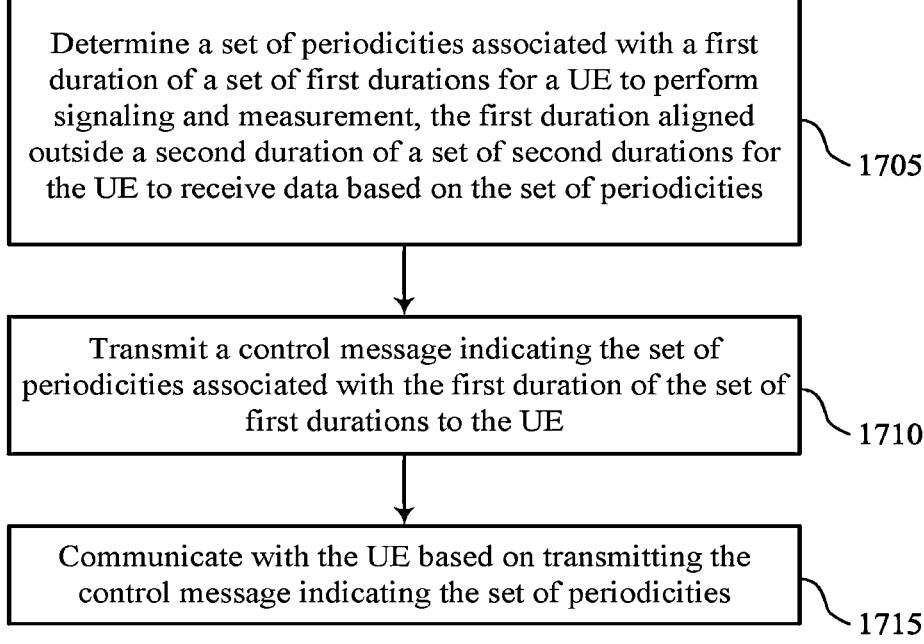

FIG. 17 illustrates a flowchart illustrating a method 1700 that supports aligning time durations for signaling and measurement in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include determining a set of periodicities associated with a first duration of a set of first durations for a UE to perform signaling and measurement, the first duration aligned outside a second duration of a set of second durations for the UE to receive data based on the set of periodicities. The operations of 1705 may be performed in accordance with examples as disclosed herein. In some examples, aspects of the operations of 1705 may be performed by a periodicity component 1125 as described with reference to FIG. 11.

At 1710, the method may include transmitting a control message indicating the set of periodicities associated with the first duration of the set of first durations to the UE. The operations of 1710 may be performed in accordance with examples as disclosed herein. In some examples, aspects of the operations of 1710 may be performed by a control message component 1130 as described with reference to FIG. 11.

At 1715, the method may include communicating with the UE based on transmitting the control message indicating the set of periodicities. The operations of 1715 may be performed in accordance with examples as disclosed herein. In some examples, aspects of the operations of 1715 may be performed by a communications component 1135 as described with reference to FIG. 11.

FIG. 18 illustrates a flowchart illustrating a method 1800 that supports aligning time durations for signaling and measurement in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include determining a set of periodicities associated with a first duration of a set of first durations for a UE to perform signaling and measurement, the first duration aligned outside a second duration of a set of second durations for the UE to receive data based on the set of periodicities. The operations of 1805 may be performed in accordance with examples as disclosed herein. In some examples, aspects of the operations of 1805 may be performed by a periodicity component 1125 as described with reference to FIG. 11.

At 1810, the method may include transmitting a control message indicating the set of periodicities associated with the first duration of the set of first durations to the UE. The operations of 1810 may be performed in accordance with examples as disclosed herein. In some examples, aspects of the operations of 1810 may be performed by a control message component 1130 as described with reference to FIG. 11.

At 1815, the method may include refraining from communicating with the UE during the first duration based on the first duration including a MG. The operations of 1815 may be performed in accordance with examples as disclosed herein. In some examples, aspects of the operations of 1815 may be performed by a communications component 1135 as described with reference to FIG. 11.

The following provides an overview of aspects of the present disclosure:

Aspect 1: A method for wireless communication at a UE, comprising: receiving, from a network entity, a control message indicating a set of periodicities associated with at least a first duration of a set of first durations for the UE to perform signaling and measurement, the first duration aligned outside of a second duration of a set of second durations for the UE to receive data based at least in part on the set of periodicities; performing one or more operations during the first duration based at least in part on the first duration of the set of first durations being aligned outside the second duration of the set of second durations; and communicating with a network entity based at least in part on receiving the control message indicating the set of periodicities and performing the one or more operations during the first duration.

Aspect 2: The method of aspect 1, wherein performing the one or more operations during the first duration comprises: performing one or more measurements during the first duration based at least in part on the first duration being aligned outside of the second duration, the first duration comprising a MG.

Aspect 3: The method of any of aspects 1 through 2, further comprising: receiving a generic SSB from the network entity during the first duration, wherein performing the one or more operations during the first duration and communicating with the network entity is based at least in part on receiving the generic SSB.

Aspect 4: The method of aspect 3, wherein the generic SSB indicates a slot offset and a symbol offset corresponding to a system frame number associated with the UE, the slot offset and the symbol offset based at least in part on the first duration being aligned outside of the second duration.

Aspect 5: The method of any of aspects 1 through 4, further comprising: receiving a cell defining SSB from the network entity based at least in part on a priority of a generic SSB being lower than a priority of the cell defining SSB, wherein performing the one or more operations during the first duration and communicating with the network entity is based at least in part on receiving the cell defining SSB.

Aspect 6: The method of any of aspects 1 through 5, wherein communicating with the network entity comprises: communicating, as part of a random access procedure, one or more signals with the network entity during the first duration, the first duration comprising a random access occasion.

Aspect 7: The method of any of aspects 1 through 6, wherein the set of periodicities comprises a first period between the first duration and an additional first duration different from the first duration and a second period between consecutive first durations, the first period different from the second period, the first duration aligned outside of the second duration based at least in part on the first period being different than the second period.

Aspect 8: The method of any of aspects 1 through 7, wherein the set of periodicities comprises a first period between consecutive first durations that is the same as a third period between consecutive second durations, the first duration aligned outside of the second duration based at least in part on the first period being the same as the third period.

Aspect 9: The method of aspect 8, wherein the first period and the third period are based at least in part on a set of quantized values or are derived from a fraction of two integers.

Aspect 10: The method of any of aspects 1 through 9, wherein the first duration is aligned outside of the second duration based at least in part on a first starting offset of a set of starting offsets, the first starting offset comprising an offset between a first time associated with the first duration and a second time associated with the second duration, the set of starting offsets comprising the first starting offset being preconfigured at the UE, indicated in the control message, or both.

Aspect 11: The method of any of aspects 1 through 10, wherein the first duration is aligned outside the second duration based at least in part on a start time for an ON-duration of a DRX cycle that is associated with the UE.

Aspect 12: The method of any of aspects 1 through 11, further comprising: receiving, from the network entity, a second control message, wherein performing the one or more operations during the first duration and communicating with the network entity is based at least in part on receiving the second control message.

Aspect 13: The method of aspect 12, wherein the second control message comprises a wakeup signal.

Aspect 14: The method of any of aspects 1 through 13, wherein a start time of the first duration is based at least in part on a timing reference value corresponding to a system frame number associated with the UE, the first duration aligned outside the second duration based at least in part on the start time of the first duration.

Aspect 15: A method for wireless communication, comprising: determining a set of periodicities associated with a first duration of a set of first durations for a UE to perform signaling and measurement, the first duration aligned outside a second duration of a set of second durations for the UE to receive data based at least in part on the set of periodicities; transmitting a control message indicating the set of periodicities associated with the first duration of the set of first durations to the UE; and communicating with the UE based at least in part on transmitting the control message indicating the set of periodicities.

Aspect 16: The method of aspect 15, wherein the first duration comprises a MG for the UE to perform measurements, wherein communicating with the UE comprises: refraining from communicating with the UE during the first duration based at least in part on the first duration comprising a MG.

Aspect 17: The method of any of aspects 15 through 16, further comprising: transmitting a generic SSB to the UE during the first duration, wherein communicating with the UE is based at least in part on transmitting the generic SSB.

Aspect 18: The method of aspect 17, wherein the generic SSB indicates a slot offset and a symbol offset corresponding to a system frame number associated with the UE, the slot offset and the symbol offset based at least in part on the first duration being aligned outside of the second duration.

Aspect 19: The method of any of aspects 15 through 18, wherein communicating with the UE comprises: refraining from transmitting a generic SSB to the UE during the first duration based at least in part on a priority of the generic SSB, the first duration associated with the generic SSB, the priority of the generic SSB lower than a priority of a cell defining SSB; and transmitting the cell defining SSB to the UE during the first duration based at least in part on the priority of the generic SSB being lower than the priority of the cell defining SSB, wherein communicating with the UE is based at least in part on refraining from transmitting the generic SSB and transmitting the cell defining SSB.

Aspect 20: The method of any of aspects 15 through 19, wherein communicating with the UE comprises: communicating, as part of a random access procedure, one or more signals with the UE during the first duration, the first duration comprising a random access occasion.

Aspect 21: The method of any of aspects 15 through 20, wherein the set of periodicities comprises a first period between the first duration and an additional first duration different from the first duration and a second period between consecutive first durations, the first period different from the second period, the first duration aligned outside of the second duration based at least in part on the first period being different than the second period.

Aspect 22: The method of any of aspects 15 through 21, wherein the set of periodicities comprises a first period between consecutive first durations that is the same as a third period between consecutive second durations, the first duration aligned outside of the second duration based at least in part on the first period being the same as the third period.

Aspect 23: The method of aspect 22, wherein the first period and the third period are based at least in part on a set of quantized values or are derived from a fraction of two integers.

Aspect 24: The method of any of aspects 15 through 23, wherein the first duration is aligned outside of the second duration based at least in part on a first starting offset of a set of starting offsets, the first starting offset comprising an offset between a first time associated with the first duration and a second time associated with the second duration, the set of starting offsets comprising the first starting offset being preconfigured at the UE, indicated in the control message, or both.

Aspect 25: The method of any of aspects 15 through 24, wherein the first duration is aligned outside the second duration based at least in part on a start time for an ON-duration of a DRX cycle that is associated with the UE.

Aspect 26: The method of any of aspects 15 through 25, further comprising: transmitting a second control message to the UE, wherein communicating with the UE is based at least in part on transmitting the second control message.

Aspect 27: The method of aspect 26, wherein the second control message comprises a wakeup signal.

Aspect 28: The method of any of aspects 15 through 27, wherein a start time of the first duration is based at least in part on a timing reference value corresponding to a system frame number associated with the UE, the first duration aligned outside the second duration based at least in part on the start time of the first duration.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication, comprising a processor; memory coupled with the processor; and instructions stored in the memory and executable by the processor to cause the apparatus to perform a method of any of aspects 15 through 28.

Aspect 33: An apparatus for wireless communication, comprising at least one means for performing a method of any of aspects 15 through 28.

Aspect 34: A non-transitory computer-readable medium storing code for wireless communication, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, a control message indicating a set of periodicities associated with at least a first duration of a set of first durations for the UE to perform signaling and measurement, wherein the set of periodicities are based at least in part on a set of second durations in which the UE receives data in accordance with a periodic pattern, and wherein the first duration is aligned outside of a second duration of the set of second durations based at least in part on the set of periodicities associated with at least the first duration aligning the set of first durations outside of the set of second durations in accordance with one or more offsets associated with a system frame number associated with the UE, a timing reference value corresponding to the system frame number, or both;
   performing one or more operations during the first duration based at least in part on the first duration of the set of first durations being aligned outside the second duration of the set of second durations; and
   communicating with the network entity based at least in part on receiving the control message indicating the set of periodicities and performing the one or more operations during the first duration.

2. The method of claim 1, wherein performing the one or more operations during the first duration comprises:
   performing one or more measurements during the first duration based at least in part on the first duration being aligned outside of the second duration, the first duration comprising a measurement gap.

3. The method of claim 1, further comprising:
   receiving a generic synchronization signal block from the network entity during the first duration, wherein performing the one or more operations during the first duration and communicating with the network entity is based at least in part on receiving the generic synchronization signal block.

4. The method of claim 3, wherein the generic synchronization signal block indicates the one or more offsets comprising a slot offset and a symbol offset corresponding to the system frame number associated with the UE, the slot offset and the symbol offset based at least in part on the first duration being aligned outside of the second duration.

5. The method of claim 1, further comprising:

receiving a cell defining synchronization signal block from the network entity based at least in part on a priority of a generic synchronization signal block being lower than a priority of the cell defining synchronization signal block, wherein performing the one or more operations during the first duration and communicating with the network entity is based at least in part on receiving the cell defining synchronization signal block.

6. The method of claim 1, wherein communicating with the network entity comprises:

communicating, as part of a random access procedure, one or more signals with the network entity during the first duration, the first duration comprising a random access occasion.

7. The method of claim 1, wherein the set of periodicities comprises a first period between the first duration and an additional first duration different from the first duration and a second period between consecutive first durations, the first period different from the second period, the first duration aligned outside of the second duration based at least in part on the first period being different than the second period.

8. The method of claim 1, wherein the set of periodicities comprises a first period between consecutive first durations that is the same as a third period between consecutive second durations, the first duration aligned outside of the second duration based at least in part on the first period being the same as the third period.

9. The method of claim 8, wherein the first period and the third period are based at least in part on a set of quantized values or are derived from a fraction of two integers.

10. The method of claim 1, wherein the first duration is aligned outside of the second duration based at least in part on a first starting offset of a set of starting offsets, the first starting offset comprising an offset between a first time associated with the first duration and a second time associated with the second duration, the set of starting offsets comprising the first starting offset being preconfigured at the UE, indicated in the control message, or both.

11. The method of claim 1, wherein the first duration is aligned outside the second duration based at least in part on a start time for an ON-duration of a discontinuous reception cycle that is associated with the UE.

12. The method of claim 1, further comprising:

receiving, from the network entity, a second control message, wherein performing the one or more operations during the first duration and communicating with the network entity is based at least in part on receiving the second control message.

13. The method of claim 12, wherein the second control message comprises a wakeup signal.

14. The method of claim 1, wherein a start time of the first duration is based at least in part on the timing reference value corresponding to the system frame number associated with the UE, the first duration aligned outside the second duration based at least in part on the start time of the first duration.

15. A method for wireless communication, comprising:

determining a set of periodicities associated with a first duration of a set of first durations for a user equipment (UE) to perform signaling and measurement based at least in part on a set of second durations in which the UE receives data in accordance with a periodic pattern, wherein the first duration is aligned outside a second duration of the set of second durations for the UE to receive data based at least in part on the set of periodicities associated with at least the first duration aligning the set of first durations outside of the set of second durations in accordance with one or more offsets associated with a system frame number associated with the UE, a timing reference value corresponding to the system frame number, or both;

transmitting a control message indicating the set of periodicities associated with the first duration of the set of first durations to the UE; and communicating with the UE based at least in part on transmitting the control message indicating the set of periodicities.

16. The method of claim 15, wherein the first duration comprises a measurement gap for the UE to perform measurements, wherein communicating with the UE comprises:

refraining from communicating with the UE during the first duration based at least in part on the first duration comprising the measurement gap.

17. The method of claim 15, further comprising:

transmitting a generic synchronization signal block to the UE during the first duration, wherein communicating with the UE is based at least in part on transmitting the generic synchronization signal block.

18. The method of claim 17, wherein the generic synchronization signal block indicates the one or more offsets comprising a slot offset and a symbol offset corresponding to the system frame number associated with the UE, the slot offset and the symbol offset based at least in part on the first duration being aligned outside of the second duration.

19. The method of claim 15, wherein communicating with the UE comprises:

refraining from transmitting a generic synchronization signal block to the UE during the first duration based at least in part on a priority of the generic synchronization signal block, the first duration associated with the generic synchronization signal block, the priority of the generic synchronization signal block lower than a priority of a cell defining synchronization signal block; and transmitting the cell defining synchronization signal block to the UE during the first duration based at least in part on the priority of the generic synchronization signal block being lower than the priority of the cell defining synchronization signal block, wherein communicating with the UE is based at least in part on refraining from transmitting the generic synchronization signal block and transmitting the cell defining synchronization signal block.

20. The method of claim 15, wherein communicating with the UE comprises:

communicating, as part of a random access procedure, one or more signals with the UE during the first duration, the first duration comprising a random access occasion.

21. The method of claim 15, wherein the set of periodicities comprises a first period between the first duration and an additional first duration different from the first duration and a second period between consecutive first durations, the first period different from the second period, the first duration aligned outside of the second duration based at least in part on the first period being different than the second period.

22. The method of claim 15, wherein the set of periodicities comprises a first period between consecutive first durations that is the same as a third period between consecutive second durations, the first duration aligned outside of the second duration based at least in part on the first period being the same as the third period.

23. The method of claim 22, wherein the first period and the third period are based at least in part on a set of quantized values or are derived from a fraction of two integers.

24. The method of claim 15, wherein the first duration is aligned outside of the second duration based at least in part on a first starting offset of a set of starting offsets, the first starting offset comprising an offset between a first time associated with the first duration and a second time associated with the second duration, the set of starting offsets comprising the first starting offset being preconfigured at the UE, indicated in the control message, or both.

25. The method of claim 15, wherein the first duration is aligned outside the second duration based at least in part on a start time for an ON-duration of a discontinuous reception cycle that is associated with the UE.

26. The method of claim 15, further comprising:
transmitting a second control message to the UE, wherein communicating with the UE is based at least in part on transmitting the second control message.

27. The method of claim 26, wherein the second control message comprises a wakeup signal.

28. The method of claim 15, wherein a start time of the first duration is based at least in part on the timing reference value corresponding to the system frame number associated with the UE, the first duration aligned outside the second duration based at least in part on the start time of the first duration.

29. A user equipment (UE) for wireless communication, comprising:
one or more memories storing processor-executable code; and
one or more processors coupled with the one or more memories and individually or collectively operable to execute the code to cause the UE to:
receive, from a network entity, a control message indicating a set of periodicities associated with at least a first duration of a set of first durations for the UE to perform signaling and measurement, wherein the set of periodicities are based at least in part on a set of second durations in which the UE receives data in accordance with a periodic pattern, and wherein the first duration is aligned outside of a second duration of the set of second durations based at least in part on the set of periodicities associated with at least the first duration aligning the set of first durations outside of the set of second durations in accordance with one or more offsets associated with a system frame number associated with the UE, a timing reference value corresponding to the system frame number, or both;
perform one or more operations during the first duration based at least in part on the first duration of the set of first durations being aligned outside the second duration of the set of second durations; and
communicate with the network entity based at least in part on receiving the control message indicating the set of periodicities and performing the one or more operations during the first duration.

30. A network entity for wireless communication, comprising:
one or more memories storing processor-executable code; and
one or more processors coupled with the one or more memories and individually or collectively operable to execute the code to cause the network entity to:
determine a set of periodicities associated with a first duration of a set of first durations for a user equipment (UE) to perform signaling and measurement based at least in part on a set of second durations in which the UE receives data in accordance with a periodic pattern, wherein the first duration is aligned outside a second duration of the set of second durations based at least in part on the set of periodicities associated with at least the first duration aligning the set of first durations outside of the set of second durations in accordance with one or more offsets associated with a system frame number associated with the UE, a timing reference value corresponding to the system frame number, or both;
transmit a control message indicating the set of periodicities associated with the first duration of the set of first durations to the UE; and
communicate with the UE based at least in part on transmitting the control message indicating the set of periodicities.

* * * * *